(12) United States Patent
Changizi

(10) Patent No.: US 12,280,874 B2
(45) Date of Patent: Apr. 22, 2025

(54) LIGHT BLOCKING CURTAINS AND RELATED METHODS

(71) Applicant: The Boeing Company, Chicago, IL (US)

(72) Inventor: Navid Changizi, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 354 days.

(21) Appl. No.: 17/986,792

(22) Filed: Nov. 14, 2022

(65) Prior Publication Data

US 2024/0158081 A1    May 16, 2024

(51) Int. Cl.
*B64D 11/00*    (2006.01)

(52) U.S. Cl.
CPC ................ *B64D 11/0023* (2013.01)

(58) Field of Classification Search
CPC ..... E06B 2009/2627; E06B 2009/2625; E06B 9/262; A47H 23/00; A47H 23/02; A47H 23/04; A47H 13/14; A47H 21/00; A47H 15/04; A47H 2/00; A47H 2/02; B64D 11/0023
See application file for complete search history.

(56) References Cited

U.S. PATENT DOCUMENTS

| | | | | |
|---|---|---|---|---|
| 4,274,467 A | * | 6/1981 | Comeau | E06B 9/0638 160/183 |
| 5,205,333 A | * | 4/1993 | Judkins | E06B 9/266 428/116 |
| 5,205,334 A | * | 4/1993 | Judkins | E06B 9/174 160/242 |

(Continued)

FOREIGN PATENT DOCUMENTS

| | | |
|---|---|---|
| JP | 2017201115 A | 11/2017 |
| JP | 6408952 B2 | 10/2018 |

(Continued)

OTHER PUBLICATIONS

Machine-generated English language translation of JP6408952B2, downloaded from Google Patents Nov. 14, 2022.

(Continued)

*Primary Examiner* — Johnnie A. Shablack
(74) *Attorney, Agent, or Firm* — Kolitch Romano Dascenzo Gates LLC

(57) ABSTRACT

Light blocking curtains may be selectively transitioned between a deployed configuration and a stowed configuration. The light blocking curtain may include a curtain body and a curtain header, and may be folded along respective curtain body pleats and header pleats in the stowed configuration. The curtain header may extend vertically from the upper end region of the light blocking curtain towards the lower end region of the light blocking curtain, though the curtain header may be substantially vertically shorter than the curtain body. The curtain header also may include a plurality of light blocking panels that are coupled to or integrally formed with the curtain header. Each light blocking panel may be positioned with respect to two adjacent segments of the curtain header, adjacent a top edge of the light blocking curtain, such that the light blocking panels may prevent or reduce light leak along the top edge.

20 Claims, 14 Drawing Sheets

(56) References Cited

U.S. PATENT DOCUMENTS

| | | | | |
|---|---|---|---|---|
| 5,273,097 | A * | 12/1993 | Siegler | E06B 9/262 160/84.01 |
| 5,297,607 | A * | 3/1994 | Beauchamp | E06B 9/367 160/84.04 |
| 5,713,407 | A * | 2/1998 | Judkins | E06B 9/36 160/126 |
| 5,749,404 | A * | 5/1998 | Colson | E06B 9/367 160/84.04 |
| 5,797,442 | A * | 8/1998 | Colson | B29C 53/40 160/236 |
| 5,832,979 | A * | 11/1998 | Marusak | E06B 9/36 160/173 V |
| 5,857,511 | A * | 1/1999 | Judkins | A47H 13/14 160/348 |
| 6,152,205 | A * | 11/2000 | Toti | E06B 9/362 160/84.04 |
| 6,202,967 | B1 * | 3/2001 | Fraczek | A47H 23/01 248/261 |
| 6,598,650 | B1 * | 7/2003 | Palmer | B29C 66/0242 160/236 |
| 9,856,695 | B2 * | 1/2018 | Leadens, III | B64D 11/0023 |
| 10,113,358 | B1 * | 10/2018 | Silverberg | E06B 9/266 |
| 10,244,881 | B2 * | 4/2019 | Judkins | A47H 13/02 |
| 10,597,935 | B2 * | 3/2020 | Rupel | E06B 9/262 |
| 10,718,155 | B2 * | 7/2020 | Wen | E06B 9/367 |
| 12,110,740 | B2 * | 10/2024 | Huang | E06B 9/38 |
| 2003/0051823 | A1 * | 3/2003 | Nien | A47H 23/06 160/168.1 R |
| 2004/0031573 | A1 * | 2/2004 | Allsopp | A47H 23/04 160/89 |
| 2006/0118250 | A1 * | 6/2006 | Jin | E06B 9/264 160/107 |
| 2006/0249261 | A1 * | 11/2006 | Elembaby | E06B 9/36 160/89 |
| 2007/0006979 | A1 * | 1/2007 | Hsu | E06B 9/262 160/89 |
| 2018/0298684 | A1 * | 10/2018 | Siebenaller | E06B 9/386 |
| 2019/0045962 | A1 * | 2/2019 | Baines | B32B 27/08 |
| 2020/0032580 | A1 * | 1/2020 | Strand | E06B 9/386 |
| 2024/0158081 | A1 * | 5/2024 | Changizi | B64D 11/0023 |

FOREIGN PATENT DOCUMENTS

| | | |
|---|---|---|
| JP | 6718719 B2 | 7/2020 |
| JP | 2020105737 A | 7/2020 |
| JP | 2020133299 A | 8/2020 |
| JP | 6783158 B2 | 11/2020 |
| JP | 6971581 B2 | 11/2021 |
| JP | 6997562 B2 | 1/2022 |
| WO | WO2016031761 A1 | 3/2016 |
| WO | WO2017170700 A1 | 5/2017 |

OTHER PUBLICATIONS

Machine-generated English language translation of JP6718719B2, downloaded from Google Patents Nov. 14, 2022.
Machine-generated English language translation of JP6783158B2, downloaded from Google Patents Nov. 14, 2022.
Machine-generated English language translation of JP6971581B2, downloaded from Google Patents Nov. 14, 2022.
Machine-generated English language translation of JP6997562B2, downloaded from Google Patents Nov. 14, 2022.
Machine-generated English language translation of JP2017201115A, downloaded from Google Patents Nov. 14, 2022.
Machine-generated English language translation of JP2020105737A, downloaded from Google Patents Nov. 14, 2022.
Machine-generated English language translation of JP2020133299A, downloaded from Google Patents Nov. 14, 2022.
Machine-generated English language translation of WO2016031761A1, downloaded from Google Patents Nov. 14, 2022.
Machine-generated English language translation of WO2017170700A1, downloaded from Google Patents Nov. 14, 2022.

* cited by examiner

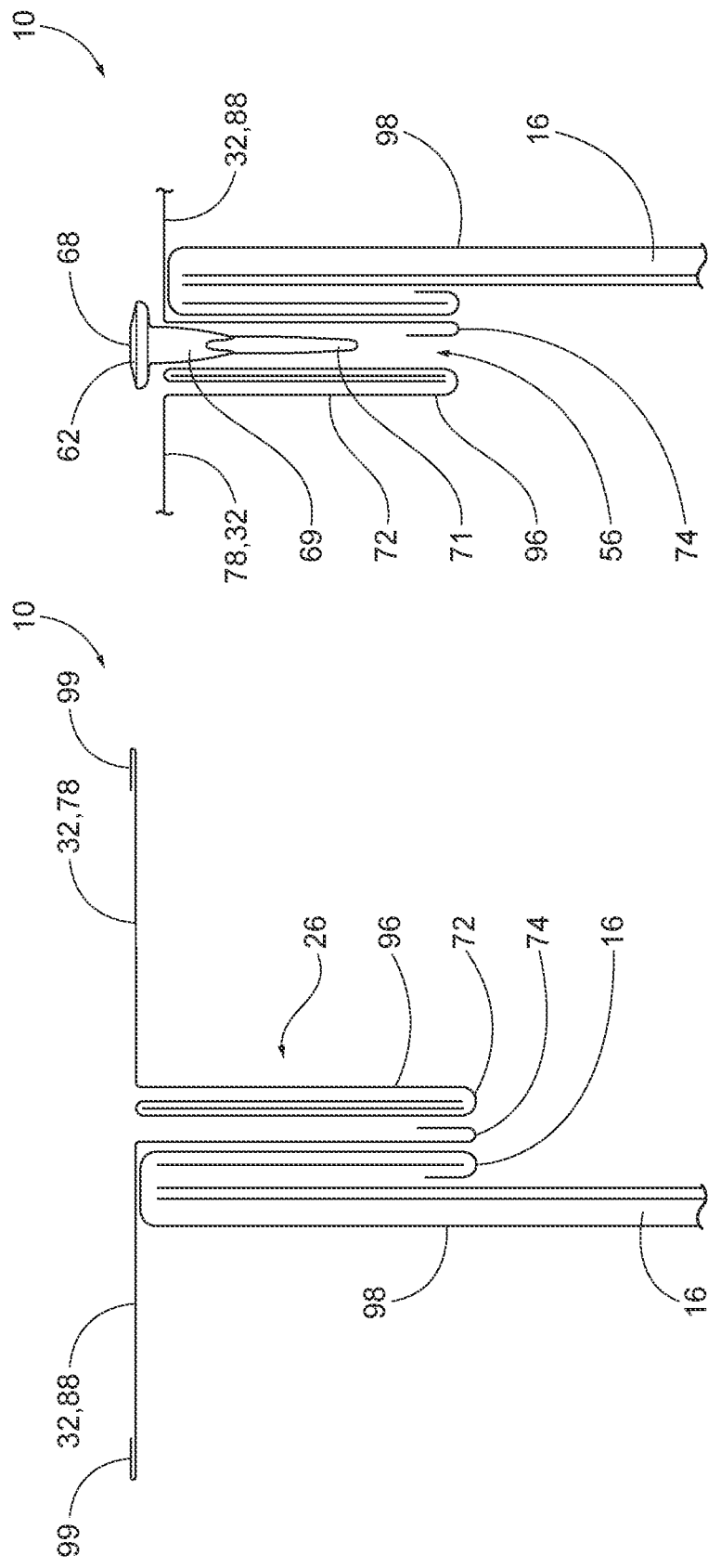

LIGHT BLOCKING CURTAINS AND RELATED METHODS

FIELD

The present disclosure relates generally to curtains and more particularly to light blocking curtains designed to prevent light leak.

BACKGROUND

Commercial aircraft often use curtains for partitioning the cabin between sections of the aircraft, such as first class, business class, and/or economy class sections. Conventional curtains used for this purpose disadvantageously allow light to pass through from one section to another due to horizontal open spaces between the pleats of a curtain along the top of the curtain (often referred to as "light leak"). Some conventional curtains utilize custom-made closeout seals to close the gap between the curtain track and the cabin ceiling when the curtain is closed, but light leak still occurs at the top of the curtain between the pleats. Such light leak between the curtain pleats results in light shining from one side to the other side of the curtain, which may be undesirable to passengers or crew.

SUMMARY

Presently disclosed light blocking curtains are configured to block light leak from a top of the curtain by including foldable light blocking panels near the top of the curtain between the curtain pleats. One example of a light blocking curtain extends vertically from an upper end region to a lower end region and is configured to be transitioned between a deployed configuration and a stowed configuration. The light blocking curtain may include a curtain body and a curtain header. The curtain body may extend vertically between the upper end region and the lower end region and horizontally from a first lateral side to a second lateral side. The curtain body may be configured to be folded to transition the light blocking curtain to the stowed configuration, such that the curtain body extends horizontally to a lesser extent than when the light blocking curtain is in the deployed configuration. The curtain body may include a plurality of curtain body pleats and a plurality of curtain body segments with each curtain body pleat extending vertically from the upper end region to or towards the lower end region. Each respective curtain body segment may extend horizontally between a respective adjacent pair of curtain body pleats.

The curtain header may be positioned within the upper end region and extend vertically from the upper end region towards the lower end region, though the curtain header may be substantially vertically shorter than the curtain body. The curtain header extends horizontally from the first lateral side of the curtain body to the second lateral side of the curtain body. Similar to the curtain body, the curtain header may include a plurality of header pleats that extend vertically along the curtain header, and each respective header pleat may be substantially collinear with a respective curtain body pleat such that the curtain header is configured to fold with the curtain body when the light blocking curtain is transitioned to the stowed configuration. The curtain header also may include a plurality of header segments, with each header segment extending horizontally between a respective adjacent pair of header pleats. The curtain header also may include a plurality of light blocking panels, with each respective light blocking panel being positioned such that it spans three respective adjacent curtain body pleats and three respective adjacent header pleats. Each respective light blocking panel may be positioned with respect to two respective adjacent header segments adjacent a top edge of the light blocking curtain such that each respective light blocking panel is configured to prevent or reduce light leak along the top edge of the light blocking curtain between a respective pair of adjacent header segments.

Aircraft including presently disclosed light blocking curtains are also within the scope of the present disclosure. Such aircraft may include a track, with the light blocking curtain being coupled to the track via a plurality of sliders. In this manner, the light blocking curtain may be configured to be transitioned between the deployed configuration and the stowed configuration by sliding the sliders along the track to fold or unfold the light blocking curtain.

Methods of preventing or reducing light leak also are within the scope of the present disclosure. Such methods generally may include forming the light blocking curtain according to the present disclosure, and extending the light blocking curtain to the deployed configuration, thereby automatically unfolding the plurality of light blocking panels such that they are positioned and configured to reduce light leak along the top edge of the light blocking curtain.

BRIEF DESCRIPTION OF THE DRAWINGS

FIG. 17 is a section view of a portion of an example of a light blocking panel according to the present disclosure, taken along line 17-17 in FIG. 10.

FIG. 18 is a section view of a portion of an example of a light blocking panel according to the present disclosure, taken along line 18-18 in FIG. 16.

DESCRIPTION

Figure 1:
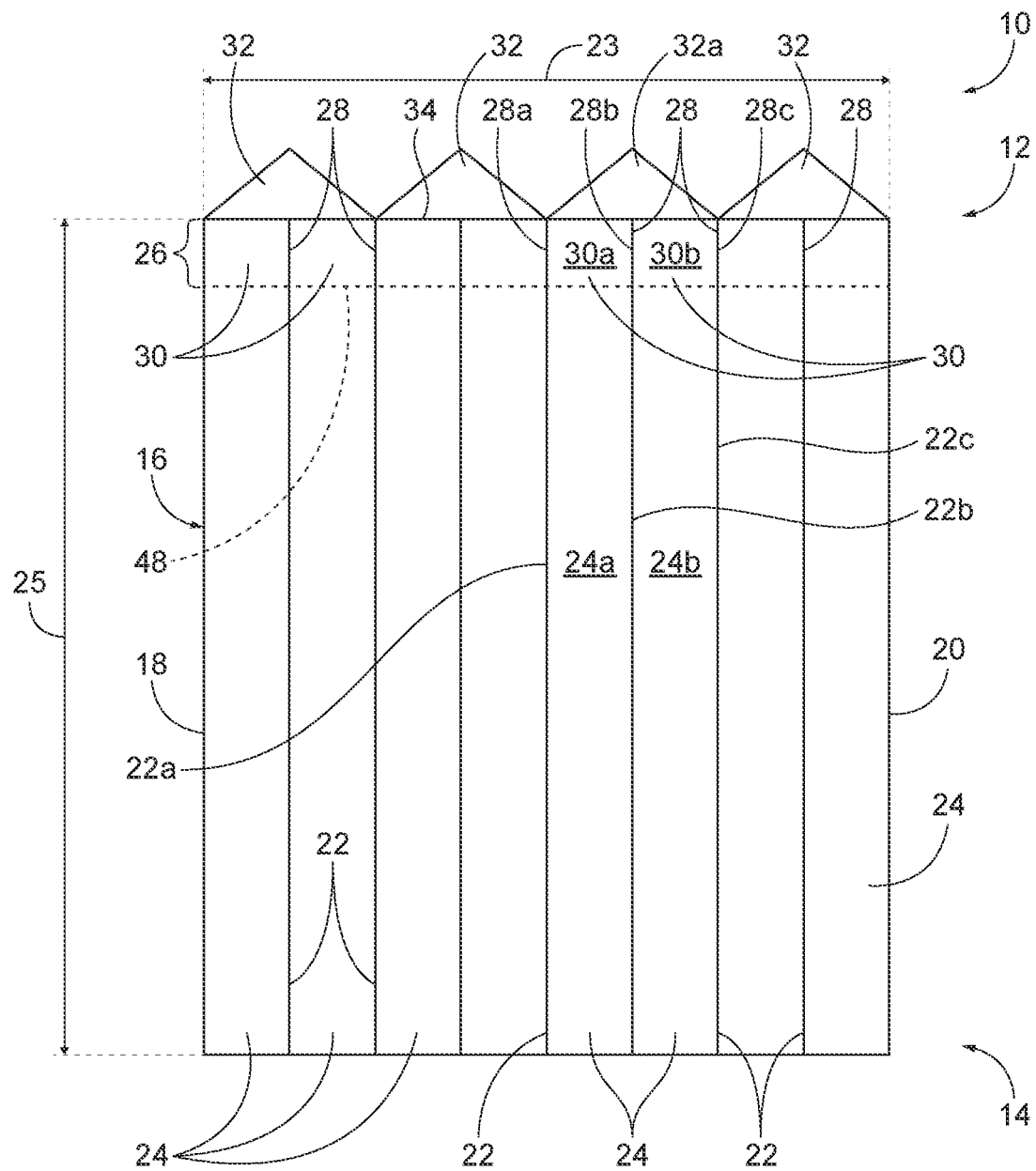
FIG. 1 is a schematic representation of illustrative examples of light blocking curtains according to the present disclosure, in a flattened arrangement.

FIGS. 1-4 provide illustrative, non-exclusive examples of light blocking curtains 10 according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any other Figures without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

With reference to FIG. 1, light blocking curtain 10 extends vertically (e.g., along a length 25 of light blocking curtain 10) from an upper end region 12 to a lower end region 14. Light blocking curtains 10 are generally suspended from a track or railing, which may be secured to a cabin ceiling or other structure or mount. In typical configurations, light blocking curtain 10 will be secured to the track or railing via components within upper end region 12, such that a curtain body 16 hangs down from the track or railing. Curtain body 16 may be any suitable length in the vertical direction. For example, curtain body 16 may be sized such that lower end region 14 of light blocking curtain 10 is positioned at or near a cabin floor in some examples. While examples herein are described in the context of light blocking curtains for use in an aircraft cabin, said light blocking curtains 10 may be used in other vehicles, buildings, structures, etc., such as in transit vehicles, shipping containers, shelters, trains, buses, automobile bodies, architectural curtain walls, partitions, expandable hospital shelters, and/or within interior spaces of a building. In some examples, light blocking curtain 10 may be secured at both upper end region 12 and lower end region 14, and/or light blocking curtain 10 may be deployed in a non-vertical orientation in some examples. In other words, elements may be described herein as extending "vertically," which is in reference to the orientation of light blocking curtains 10 in typical use, where gravity causes lower end region 14 to hang downward from upper end region 12, which is used as a convention for describing the features of light blocking curtains 10, without limiting use of light blocking curtains 10 to strictly vertical applications. Light blocking curtain 10 is configured to be selectively and reversibly transitioned between a deployed configuration and a stowed configuration, as will be described in further detail herein.

Curtain body 16 extends vertically between upper end region 12 and lower end region 14. Curtain body 16 extends horizontally, or laterally, from a first lateral side 18 to a second lateral side 20. Curtain body 16 is configured to be folded to transition light blocking curtain 10 to the stowed configuration, such that curtain body 16 extends horizontally, or laterally, to a lesser extent when light blocking curtain 10 is in the stowed configuration than when light blocking curtain 10 is in the deployed configuration. Specifically, curtain body 16 includes a plurality of curtain body pleats 22 and a plurality of curtain body segments 24 that may be configured to facilitate folding of light blocking curtain 10 to the stowed configuration. FIG. 1 schematically represents light blocking curtain 10 in the deployed configuration, having a deployed width 23. In the stowed configuration, curtain body 16 is folded along curtain body pleats 22 such that the width is reduced, as compared to deployed width 23. Each curtain body pleat 22 extends vertically (e.g., along length 25 of light blocking curtain 10) from upper end region 12 to or towards lower end region 14. In some examples, one or more of curtain body pleats 22 may extend along substantially the entire length 25 of light blocking curtain 10. In other examples, one or more curtain body pleats 22 may extend along only a portion of length 25 of light blocking curtain 10. Each respective curtain body segment 24 extends horizontally, or laterally, between a respective adjacent pair of curtain body pleats 22. For example, curtain body segment 24a extends laterally between curtain body pleat 22a and curtain body pleat 22b.

Light blocking curtain 10 also includes a curtain header 26 positioned within upper end region 12. Curtain header 26 extends vertically (e.g., along length 25 of light blocking curtain 10) from upper end region 12 towards lower end region 14, but curtain header 26 generally does not extend all the way to lower end region 14. In other words, curtain header 26 is generally substantially shorter in length than curtain body 16, as illustrated in FIG. 1. Dashed line 48 represents the vertical extent of an example of curtain header 26 in FIG. 1 (e.g., a bottom 48 of curtain header 26), though in other examples of light blocking curtain 10, bottom 48 of curtain header 26 may be closer to a top edge 34 of light blocking curtain 10, or closer to lower end region 14 (in other words, curtain header 26 may have a length that is a smaller or greater proportion of length 25 than is shown in FIG. 1 in various examples of light blocking curtain 10). Curtain header 26 generally extends laterally from first lateral side 18 to second lateral side 20 of curtain body 16. In other words, curtain header 26 may have a width that is at least substantially equal to the width 23 of curtain body 16, though in some examples, curtain header 26 may not extend laterally to the same extent as curtain body 16. Curtain header 26 includes a plurality of header pleats 28 that extend vertically along curtain header 26 (e.g., from upper end region 12 towards lower end region 14, or along length 25 of light blocking curtain 10). Each respective header pleat 28 is at least substantially collinear with a respective curtain body pleat 22. For example, header pleat 28a is at least substantially collinear with curtain body pleat 22a. Put another way, each respective header pleat 28 is typically aligned with a respective curtain body pleat 22. In this manner, curtain header 26 is configured to fold with curtain body 16 when light blocking curtain 10 is transitioned to or towards the stowed configuration.

Curtain header 26 also includes a plurality of header segments 30, with each header segment 30 extending laterally between a respective adjacent pair of header pleats 28. For example, header segment 30a extends laterally between header pleat 28a and header pleat 28b.

Curtain header 26 also includes a plurality of light blocking panels 32, which may be coupled to curtain header 26 or integrally formed with curtain header 26. Light blocking panels 32 are schematically represented in a flattened, triangular form above top edge 34 of light blocking curtain 10 in FIG. 1, for simplicity, but it will be apparent from other illustrations herein that light blocking panels 32 are configured to be folded and stowed between adjacent header segments 30 and curtain body segments 24 when light blocking curtain 10 is in the stowed configuration, and further it will be apparent that light blocking panels 32 are configured to be arranged substantially orthogonally to curtain body 16 when light blocking curtain 10 is in the deployed configuration. Generally, each light blocking panel 32 is positioned such that each respective light blocking panel 32 spans three respective adjacent curtain body pleats 22 and three respective adjacent header pleats 28, and such that each respective light blocking panel 32 is positioned with respect to two respective adjacent header segments 30 adjacent top edge 34 of light blocking curtain 10 such that each respective light blocking panel 32 is configured to prevent or reduce light leak along a portion of top edge 34 of light blocking curtain 10 between a respective pair of adjacent header segments 30 (e.g., each respective light blocking panel 32 is configured to prevent or reduce light leak along the span of the respective light blocking panel 32). For example, light blocking panel 32a spans the adjacent curtain body pleats 22a, 22b, and 22c, the three adjacent header pleats 28a, 28b, and 28c, and is configured to prevent or reduce light leak along top edge 34 between the pair of adjacent header segments 30a and 30b. A plurality of light blocking panels 32 together may be configured to prevent or reduce light leak along top edge 34 of light blocking curtain 10.

Light blocking panels 32, and/or curtain headers 26 that include integrally formed light blocking panels 32, may be retrofit onto conventional curtains, in some examples. In other words, conventional curtains may be outfitted with disclosed curtain headers 26 or light blocking panels 32 without necessarily needing to modify other aspects of the curtain or the mounting system to which it attaches.

Light blocking curtain 10 is generally configured to be transitioned from the deployed configuration to the stowed configuration by folding light blocking curtain 10 along each of the plurality of curtain body pleats 22 such that each adjacent pair of curtain body segments 24 are closed together or towards each other. Each respective light blocking panel 32 may be configured to be folded and stowed between a respective pair of adjacent curtain body segments 24 when light blocking curtain 10 is in the stowed configuration. For example, light blocking panel 32a may be configured to be folded and stowed between curtain body segment 24a and curtain body segment 24b when light blocking curtain 10 is folded into the stowed configuration. Light blocking panels 32 generally are configured such that they are automatically unfolded and thereby configured to prevent or reduce light leak along top edge 34 when light blocking curtain 10 is transitioned from the stowed configuration to the deployed configuration.

Figure 2:
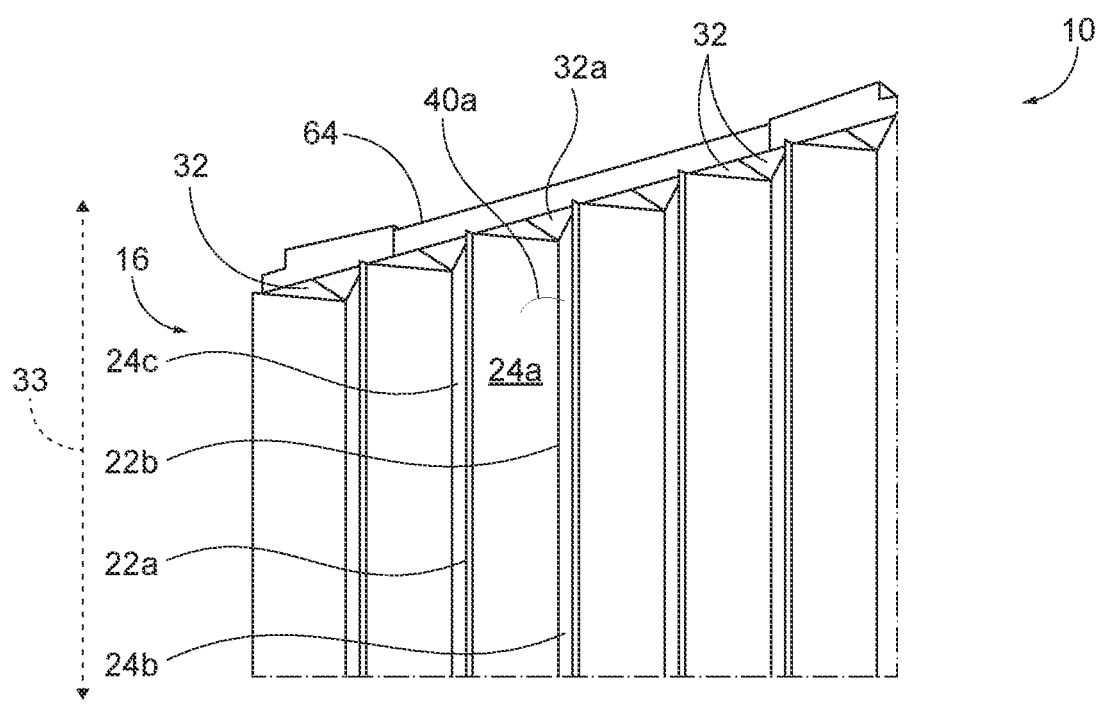
FIG. 2 is a schematic representation of an example of a portion of a light blocking curtain according to the present disclosure, shown in a deployed configuration.

FIG. 2 represents an example of light blocking curtain 10 mounted on a rail system 64, shown pleated and in the deployed configuration. As will be understood by those of ordinary skill in the art, only a portion of the length of curtain body 16 is shown. As shown in FIG. 2, each respective curtain body segment 24 may define a respective curtain segment plane. When light blocking curtain 10 is in the deployed configuration, at least a portion of each light blocking panel 32 is oriented in a panel plane that is at least substantially orthogonal to the curtain segment plane of the two respective curtain body segments 24 between which the respective light blocking panel 32 is positioned. For example, the visible portion of light blocking panel 32a is in a panel plane that is at least substantially orthogonal to the curtain segment plane of curtain body segment 24a and the curtain segment plane of curtain body segment 24b. Put another way, at least a portion of each light blocking panel 32 may be at least substantially perpendicular to a longitudinal axis 33 of curtain body 16.

As shown in FIG. 2, light blocking curtain 10 is not typically extended to the point that it is flat, even in the deployed configuration. Instead, each respective curtain body segment 24 may be oriented at a non-parallel angle with respect to each adjacent respective curtain body segment 24. For example, curtain body segment 24a is non-parallel to both curtain body segment 24b and curtain body segment 24c. Curtain body 16 is folded at curtain body pleats 22 to create such an arrangement. Generally, a respective pleat angle 40 may be defined for each curtain body pleat 22. For example, pleat angle 40a is shown for curtain body pleat 22b. In some examples, each respective light blocking panel 32 may be configured to limit a respective pleat angle 40 of a respective curtain body pleat 22 to 90 degrees or less when light blocking curtain 10 is in the deployed configuration. For example, when light blocking panel 32a is fully extended as shown, it may serve to at least substantially prevent further lateral extension of curtain body 16, such that pleat angle 40a of curtain body pleat 22b does not increase substantially above 90 degrees. In some examples, each respective light blocking panel 32 is configured to maintain a respective pleat angle 40 of a respective curtain body pleat 22 such that each respective pleat angle 40 is at least substantially the same when light blocking curtain 10 is in the deployed configuration.

Figure 3:
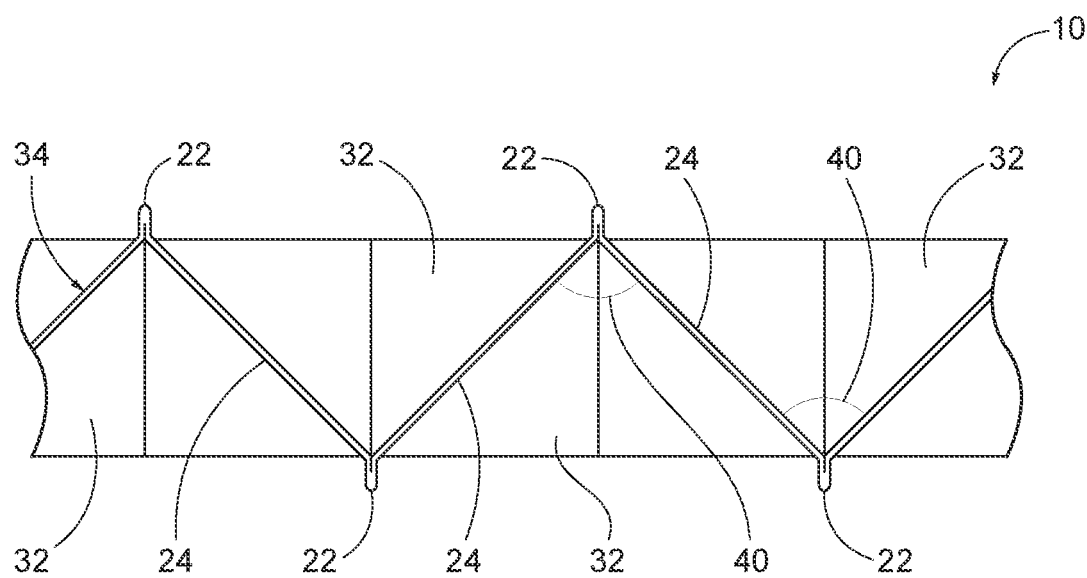
FIG. 3 is schematic representation of a portion of a light blocking curtain according to the present disclosure, in the deployed configuration and viewed from the top.

FIG. 3 illustrates a portion of an example of light blocking curtain 10 in the deployed configuration, viewed from the top (with no track or railing shown, for clarity). As will understood by those of ordinary skill in the art, only a portion of the width of light blocking curtain 10 is shown in FIG. 3. In this view, pleat angle 40 is more easily visualized. Looking from the top, curtain body segments 24 of curtain body 16 extend into the page, while light blocking panels 32 are parallel to the page (i.e., orthogonal to each curtain body segment 24).

Figure 4:
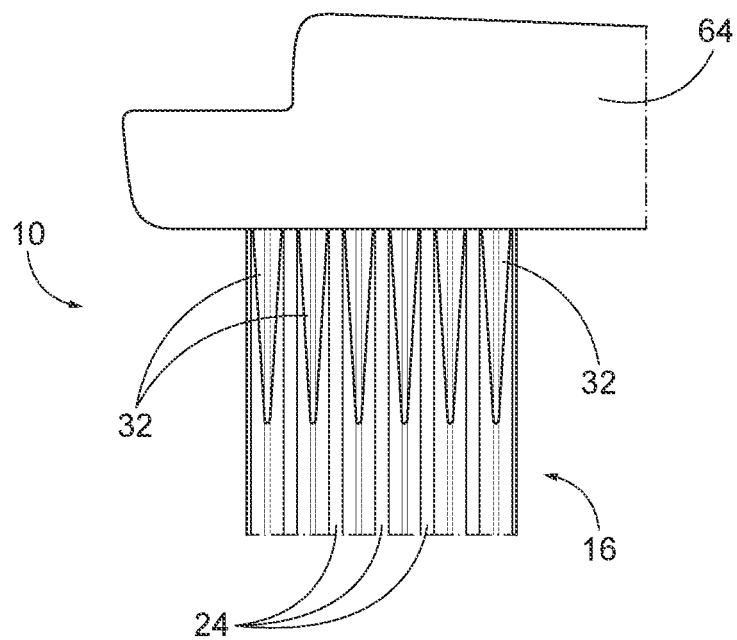
FIG. 4 is a schematic representation of an example of a portion of a light blocking curtain according to the present disclosure, shown in a stowed configuration.

FIG. 4 illustrates a portion of an example of light blocking curtain 10 in the stowed configuration, viewed from the front. As will be understood by those of ordinary skill in the art, only a portion of the length of curtain body 16 is shown in FIG. 4, along with a portion of the width of rail system 64 on which light blocking curtain 10 is mounted. FIG. 4 illustrates how each respective light blocking panel 32 may be folded and stowed between adjacent curtain body segments 24 (and/or between adjacent header segments 30) when light blocking curtain is in the stowed configuration.

Curtain body 16, curtain header 26, and light blocking panels 32 according to the present disclosure may be formed of a variety of suitable materials. In some examples, the same drapery fabric may be used to form curtain body 16, curtain header 26, and/or light blocking panels 32. In some examples, one or more different materials may be used to form curtain body 16, curtain header 26, and/or light blocking panels 32. Light blocking panels 32 of course may be formed of different materials than curtain body 16, and in some cases may be formed of thin plastic or laminated fabric rather than fabric. Light blocking curtains 10 may be formed of one layer of material, two layers of material, or three or more layers of material (also referred to as "plies"), in various examples. In examples including more than two plies, one or more exterior plies may be formed of the same material (i.e., on the front and/or back sides of light blocking curtain 10). Additionally or alternatively, the interior, or middle, ply in examples having more than two plies may be a dark-colored fabric or light baffling fabric configured to block light from passing through curtain body 16. In some examples, the front and back sides of curtain body 16 may be formed of different fabrics, materials, and/or colors. In a specific example, when light blocking curtains 10 are used to divide an airplane cabin between two different classes, different fabrics or materials may be used on each side of curtain body 16. In such examples that include light blocking panels 32 integrally formed with curtain header 26, one side of the header material may be different than the other side of the header material (which may match the fabric or material of their corresponding side of the curtain body 16), such that light blocking panels 32 may be formed of different fabrics or materials on either side of the same curtain body 16.

Turning now to FIGS. 5-18, illustrative non-exclusive examples of light blocking curtains 10 are illustrated. Where appropriate, the reference numerals from the schematic illustrations of FIGS. 1-4 are used to designate corresponding parts in FIGS. 5-18; however, the examples of FIGS. 5-18 are non-exclusive and do not limit light blocking curtains 10 to the illustrated examples of FIGS. 5-18. That is, light blocking curtains 10 are not limited to the specific examples of the illustrated in FIGS. 5-18 and may incorporate any number of the various aspects, configurations, characteristics, properties, etc. that are illustrated in and discussed with reference to the schematic representations of FIGS. 1-4 and/or the examples of FIGS. 5-18, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 5-18; however, it is within the scope of the present disclosure that the previously discussed features, variants, etc. may be utilized therewith.

Figure 5:
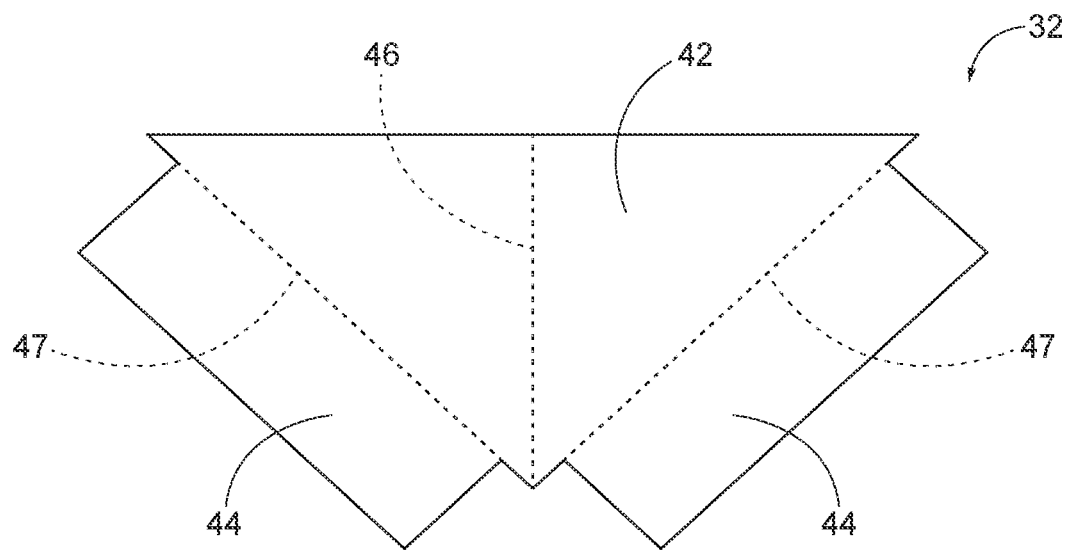
FIG. 5 is a top plan view of an example of a light blocking panel according to the present disclosure, shown in a flattened arrangement.
Figure 6:
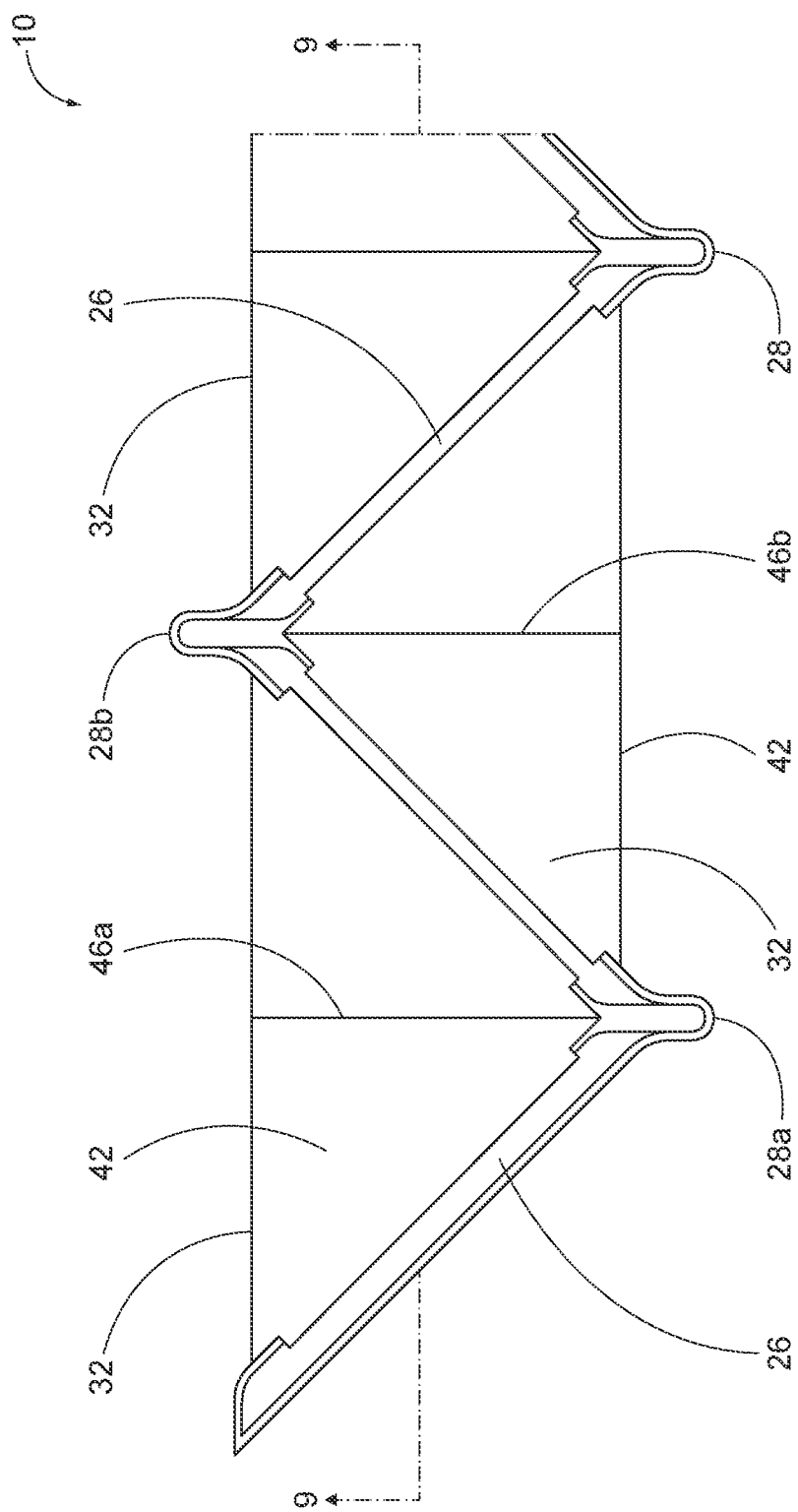
FIG. 6 is a top plan view of a portion of an example of a light blocking curtain with foldable light blocking panels according to the present disclosure.

FIGS. 5-9 illustrate examples of light blocking curtains 10 (or components thereof) in which the plurality of light blocking panels 32 are engaged with and/or coupled to curtain header 26. With reference to FIG. 5, each light blocking panel 32 may include an isosceles triangular portion 42 and two tab portions 44. Each tab portion 44 may be configured to fold with respect to isosceles triangular portion 42 (e.g., along side fold lines 47). Isosceles triangular portion 42 may be configured to be folded in half along a central fold line 46, such that each light blocking panel 32 is configured to be folded and stowed between adjacent respective header segments 30 when the light blocking panel is incorporated into a light blocking curtain and the light blocking curtain is in the stowed configuration. When light blocking panel 32 is incorporated into a light blocking curtain, central fold line 46 of each respective light blocking panel 32 may be at least substantially aligned with a respective curtain body pleat 22 and/or with a respective header pleat 28. For example, FIG. 6 illustrates a portion of an example of light blocking curtain 10, viewed from the top. As shown in FIG. 6, central fold line 46 of each respective light blocking panel 32 is aligned with a respective header pleat 28 (i.e., central fold line 46a is aligned with header pleat 28a, and central fold line 46b is aligned with header pleat 28b). As used herein, a respective central fold line 46 is said to be aligned with a respective header pleat 28 and/or curtain body pleat 22 when the central fold line 46 is substantially the same distance from a side edge of light blocking curtain 10 (e.g., from first lateral side 18 or second lateral side 20) as is the respective header pleat 28 and/or curtain body pleat 22.

Figure 7:
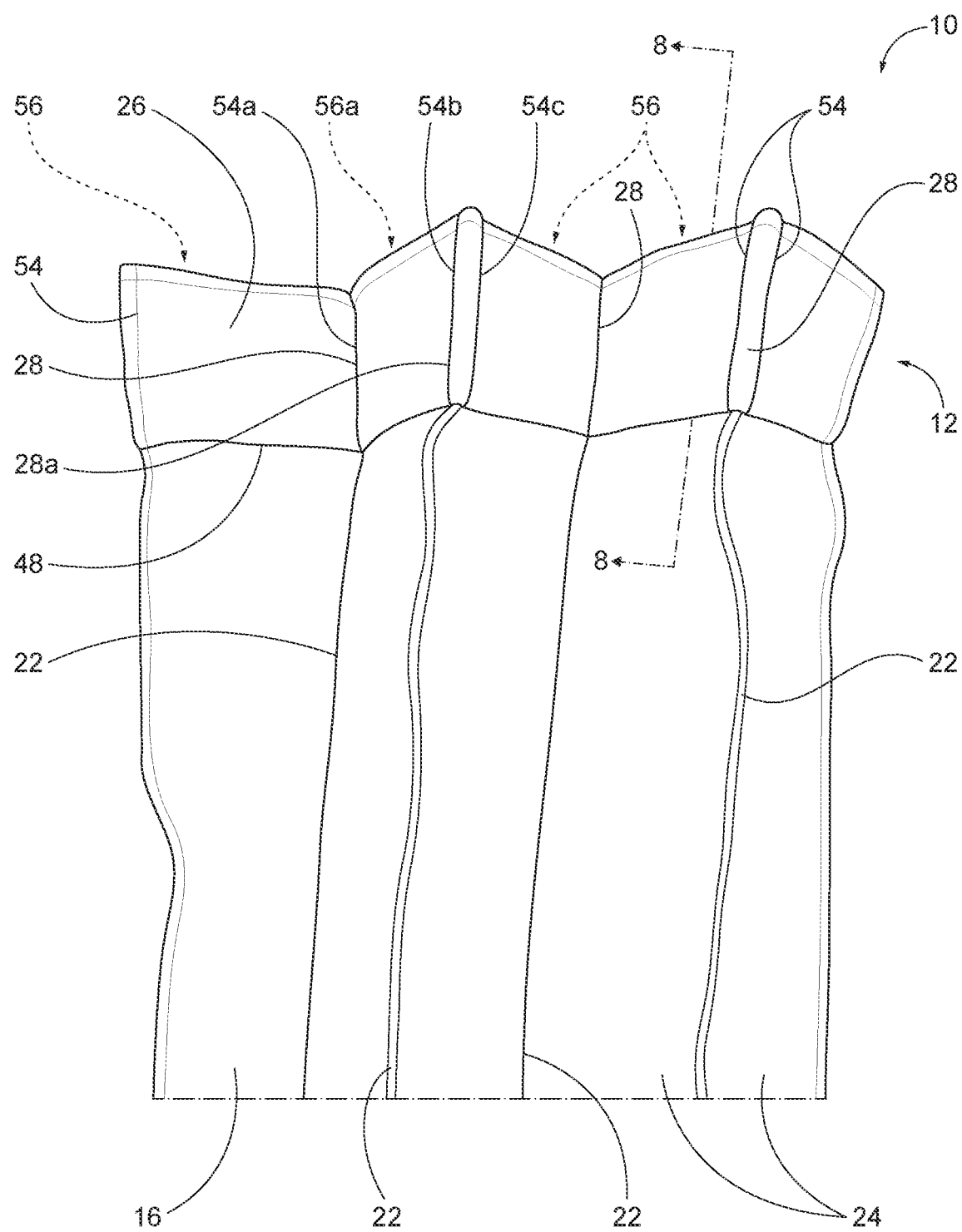
FIG. 7 is a front perspective view of a portion of an example of a light blocking curtain according to the present disclosure, shown without light blocking panels for illustrative purposes.
Figure 8:
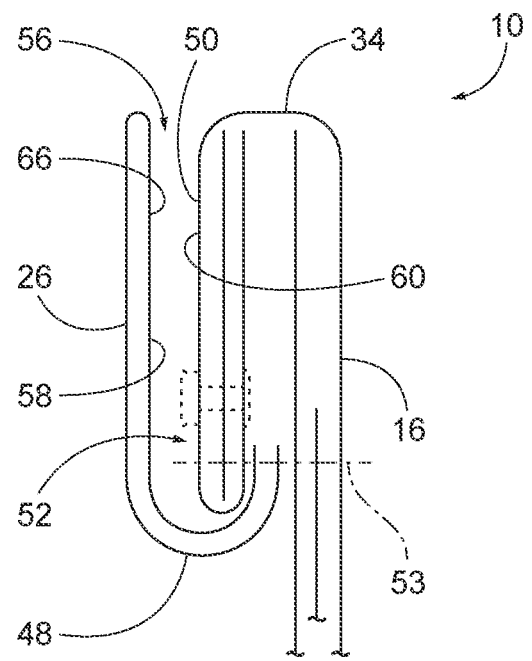
FIG. 8 is a section view of a portion of a light blocking curtain, taken along line 8-8 in FIG. 7.

With reference to FIGS. 7-8, an example of light blocking curtain 10 is illustrated before light blocking panels 32 have been coupled to curtain header 26. In some examples of light blocking curtain 10, bottom 48 of curtain header 26 is folded up to engage with a folded-over portion 50 of curtain body 16 within upper end region 12. Curtain header 26 may be coupled to curtain body 16 along an overlapping portion 52 where bottom 48 of curtain header 26 at least partially overlaps folded-over portion 50 of curtain body 16 (e.g., along a seam 53). Curtain header 26 may be coupled to curtain body 16 via a plurality of vertical seams 54, wherein each vertical seam 54 of the plurality of vertical seams 54 is positioned adjacent a respective curtain body pleat 22 and/or a respective header pleat 28. As shown in FIG. 7, in some examples, vertical seams 54 may be present on each side of a respective header pleat 28. For example, vertical seam 54b is positioned on one lateral side of header pleat 28a, and vertical seam 54c is positioned on the other lateral side of header pleat 28a. Because curtain header 26 is secured to curtain body 16 along bottom 48, and not along top edge 34 in these examples, light blocking curtain 10 may include a plurality of pockets 56 that open along top edge 34 of light blocking curtain 10. Each respective pocket 56 generally may extend laterally between a respective adjacent pair of vertical seams 54. For example, pocket 56a extends laterally between vertical seam 54a and vertical seam 54b in this example. In some examples, a first side 58 of each pocket 56 may be formed by curtain header 26, and a second side 60 of each pocket 56 may be formed by curtain body 16.

Figure 9:
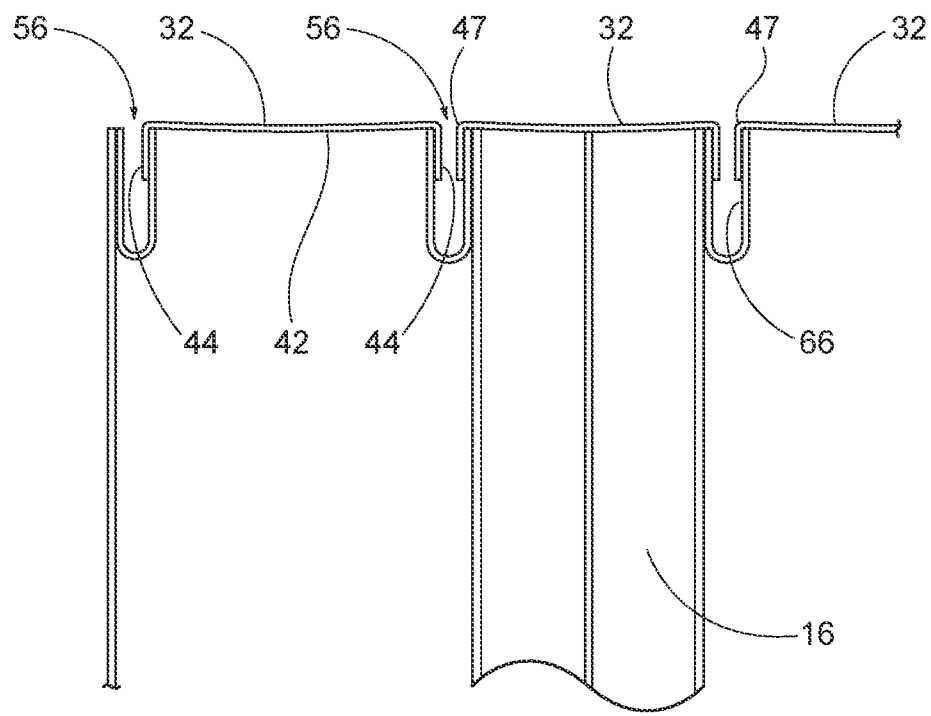
FIG. 9 is a section view of a portion of a light blocking curtain, taken along line 9-9 in FIG. 6.

As best seen in FIG. 9, each respective tab portion 44 of each respective light blocking panel 32 may be at least partially inserted into a respective pocket 56 of curtain header 26. In other words, each respective tab portion 44 of each respective light blocking panel 32 may be received in a respective pocket 56. To insert tab portions 44 into pockets 56, each tab portion 44 may be folded along a respective fold line 47 with respect to isosceles triangular portion 42 of a given light blocking panel 32. Thus, when light blocking curtain 10 is in the deployed configuration and light blocking panels 32 are in place and coupled to curtain header 26 (e.g., as shown in FIG. 9), the tab portions 44 of each light blocking panel 32 may be at least substantially perpendicular to isosceles triangular portion 42. Tab portions 44 may be bonded, adhered, sewn, or otherwise coupled to curtain header 26 (e.g., to pockets 56 of curtain header 26). In some examples, each respective tab portion 44 of each respective light blocking panel 32 is coupled to an inside wall 66 of curtain header 26 within a respective pocket 56, thereby coupling the respective light blocking panel 32 to light blocking curtain 10. Pockets 56 also may be configured to receive or house a slider (not shown) configured to engage with a rail system on which light blocking curtain 10 is configured to be mounted to slide open and closed between the deployed configuration and the stowed configuration.

Figure 10:
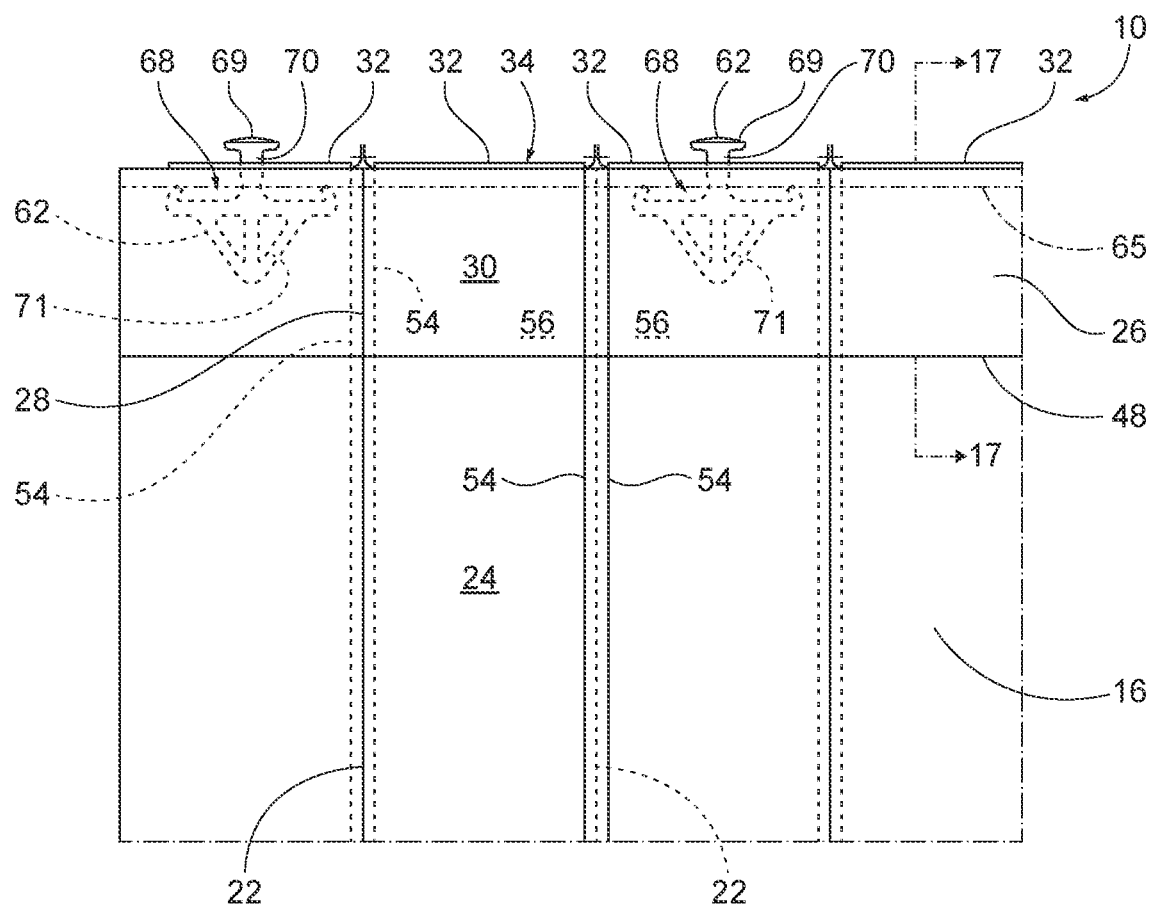
FIG. 10 is a front elevation view of a portion of an example of a light blocking curtain according to the present disclosure.
Figure 11:
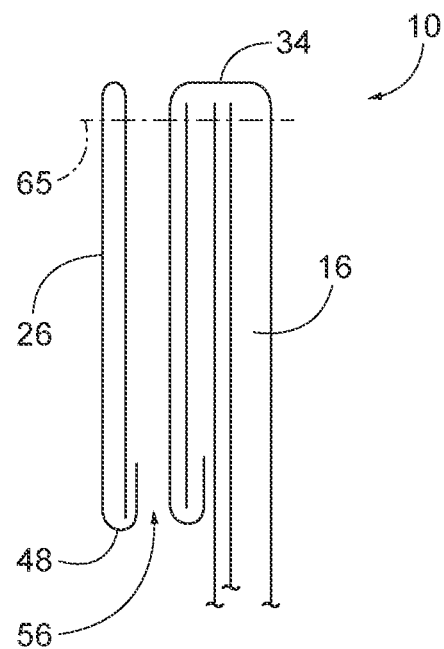
FIG. 11 is a section view of a portion of an example of a portion of a light blocking curtain having a curtain header with an open bottom.

FIGS. 10-18 illustrate examples of light blocking curtains 10 (or components thereof) in which light blocking panels 32 are integrally formed with curtain header 26. In these examples, curtain header 26 may be coupled to curtain body 16 adjacent top edge 34 of light blocking curtain 10. For example, FIG. 10 shows a front view of an example of light blocking curtain 10 in which a coupling 65 (e.g., a seam, bond, or other coupling) serves to secure curtain header 26 to curtain body 16. FIG. 11 shows an example of coupling 65 from a side section view of curtain header 26 (though light blocking panels 32 are not shown in FIG. 11, for clarity). Pockets 56 in this example are closed along top edge 34 and open along bottom 48 of curtain header 26. Coupling 65 may include a plurality of spaced apart gaps, or breaks, 68. Each respective gap 68 may be configured to receive a portion of a respective slider 62 therethrough. Sliders 62 may be configured to engage with a rail system 64 (see FIG. 2) on which light blocking curtain 10 is configured to be mounted to slide open and closed between the deployed configuration and the stowed configuration. As best seen in FIG. 10, a head portion 69 of each slider 62 may protrude beyond top edge 34 of light blocking curtain 10, while a neck portion 70 of each slider 62 may extend through a respective gap 68 in coupling 65, and an enlarged portion 71 of each slider 62 may be positioned within a respective pocket 56. Enlarged portion 71 of each slider 62 may be configured to distribute weight and prevent slider 62 from being pulled all the way through gap 68. Curtain header 26 may be coupled to curtain body 16 via a plurality vertical seams 54, wherein each vertical seam 54 may be positioned adjacent a respective curtain body pleat 22 and/or header pleat 28. Each respective pocket 56 may extend laterally between a respective adjacent pair of vertical seams 54.

Figure 12:
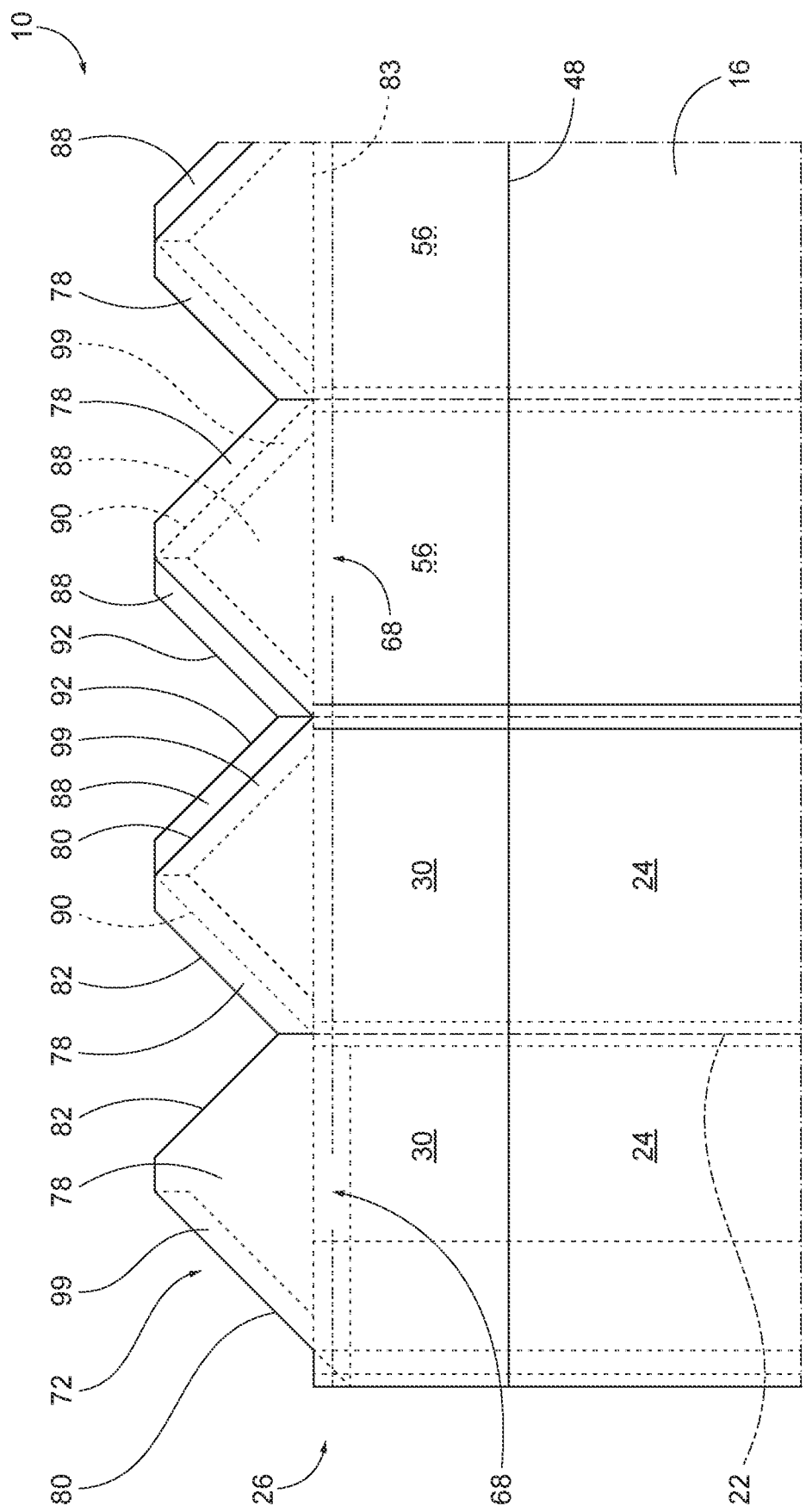
FIG. 12 is a front elevation view of a portion of an example of a light blocking curtain according to the present disclosure, shown in a flattened arrangement.
Figure 13:
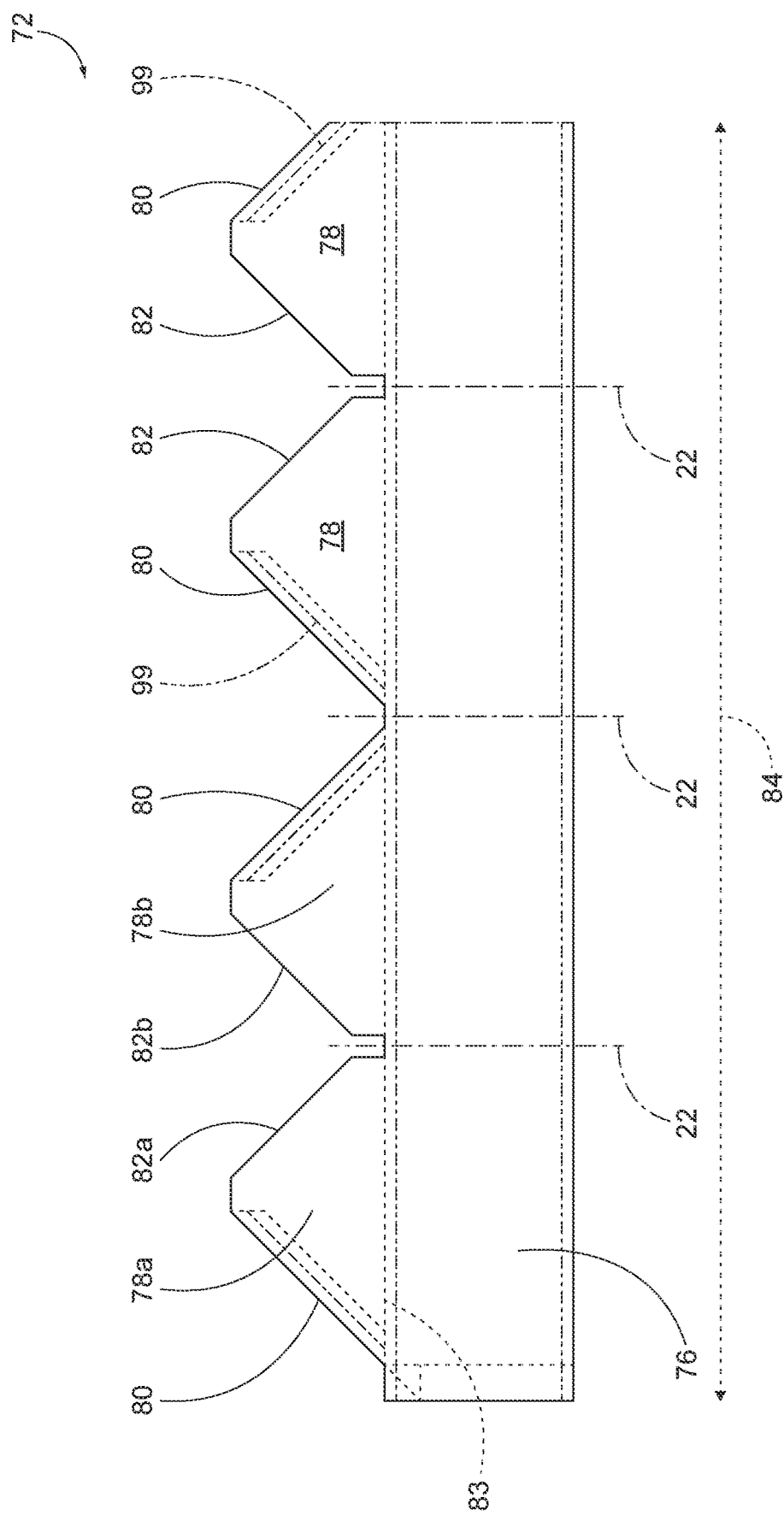
FIG. 13 is a front elevation view of a portion of an example of a near half header, shown in a flattened arrangement.
Figure 14:
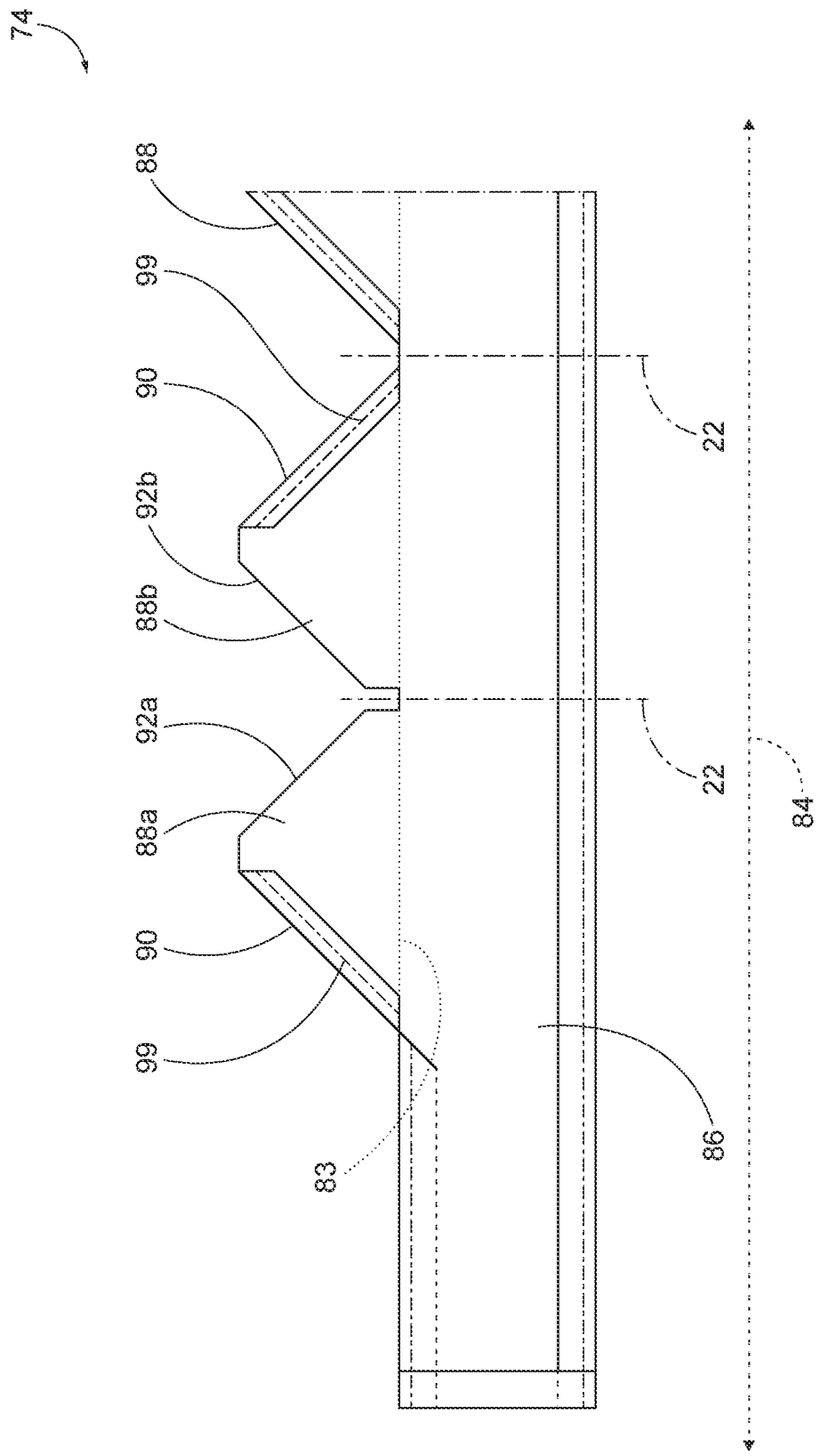
FIG. 14 is a front elevation view of a portion of an example of a far half header, shown in a flattened arrangement.

With reference to FIGS. 12-14, curtain header 26 may be formed of two halves, such as a near half header 72 (FIG. 13) and a far half header 74 (FIG. 14). Near half header 72 and far half header 74 may be at least partially overlaid onto one another to form curtain header 26. Near half header 72 and far half header 74 may be formed of the same or different materials. Pockets 56 may be formed between portions of near half header 72 and far half header 74. Near half header 72 includes a near elongated portion 76, which may be coupled to far half header 74 and curtain body 16, and a plurality of near half panels 78 extending from near elongated portion 76. Each near half panel 78 may include an outer angled edge 80 and an inner angled edge 82, wherein outer angled edge 80 and inner angled edge 82 are non-parallel and non-perpendicular to a longitudinal axis 84 of near elongated portion 76. Near half panels 78 may be arranged with respect to one another to form a plurality of pairs of adjacent near half panels 78 (two pairs of adjacent near half panels 78 are shown in FIG. 13). In each respective pair of adjacent near half panels 78, the respective inner angled edge 82 of each respective near half panel 78 of the respective pair of adjacent near half panels 78 are positioned next to each other. Near half panels 78 may be arranged with respect to one another such that each respective pair of adjacent near half panels 78 are configured to be coupled together along their respective inner angled edges 82 to form a first plurality of light blocking panels 32 on a near side 96 of light blocking curtain 10 (see FIG. 15). For example, near half panel 78a and near half panel 78b form a pair of adjacent near half panels 78, and are configured to be coupled together (e.g., sewn or bonded together) along inner angled edge 82a and inner angled edge 82b. The respective inner angled edges 82 may be coupled together after near half header 72 is coupled to a curtain body, and the curtain body, near half header 72, and far half header 74 are pleated together. Then, near half panels 78 may be configured to fold with respect to near elongated portion 76 (e.g., along a fold line 83) such that near half panels 78 are configured to be substantially transverse to near elongated portion 76 when light blocking curtain 10 is in the deployed configuration. Once inner angled edges 82 are coupled together, this seam or joint or interface may be configured to serve as a central fold line (similar to central fold line 46), along which the resulting light blocking panel 32 may be configured to fold in half to stow the light blocking panel 32 between adjacent header segments 30 when light blocking curtain 10 is folded to the stowed configuration. Light blocking panels 32 of near half header 72 may be unfolded to become substantially transverse to adjacent header segments 30 when light blocking curtain 10 is unfolded to the deployed configuration. Near half header 72 may be configured such that the plurality of near half panels 78 are positioned with respect to curtain body 16 such that a respective curtain body pleat 22 (represented by dash dot lines in FIG. 13) is aligned between each respective adjacent near half panel 78.

Similarly, as best seen in FIG. 14, far half header 74 may include a far elongated portion 86 located between and coupled to near elongated portion 76 and curtain body 16, and a plurality of far half panels 88 extending from far elongated portion 86. Each far half panel 88 may include an outer angled edge 90 and an inner angled edge 92, with outer angled edges 90 and inner angled edges 92 being non-parallel and non-perpendicular to longitudinal axis 84 of far elongated portion 86. Far half panels 88 may be arranged with respect to one another to form a plurality of pairs of adjacent far half panels 88, wherein in each respective pair of adjacent far half panels 88, the respective inner angled edge 92 of each far half panel 88 are positioned next to each other. Far half panels 88 may be arranged with respect to one another such that each respective pair of adjacent far half panels 88 are configured to be coupled together along their respective inner angled edges 92 to form a second plurality of light blocking panels 32 on a far side 98 of light blocking curtain 10 (see FIG. 15). For example, far half panel 88a and far half panel 88b form a pair of adjacent far half panels 88, and are configured to be coupled together along inner angled edge 92a and inner angled edge 92b. The respective inner angled edges 92 may be coupled together after far half header 74 is coupled to a curtain body, and the curtain body, near half header 72, and far half header 74 are pleated together. Then, far half panels 88 may be configured to fold with respect to far elongated portion 86 (e.g., along fold line 83) such that far half panels 88 are configured to be substantially transverse to far elongated portion 86 when light blocking curtain 10 is in the deployed configuration. Once inner angled edges 92 are coupled together, this seam or joint or interface may be configured to serve as a central fold line (similar to central fold line 46), along which the resulting light blocking panel 32 may be configured to fold in half to stow the light blocking panel 32 between adjacent curtain body segments 24 when light blocking curtain 10 is folded to the stowed configuration. Light blocking panels 32 of far half header 74 may be unfolded to become substantially transverse to adjacent curtain body segments 24 when light blocking curtain 10 is unfolded to the deployed configuration. Far half header 74 may be configured such that the plurality of far half panels 88 are positioned with respect to curtain body 16 such that a respective curtain body pleat 22 (represented by dash dot lines in FIG. 14) is aligned between each respective adjacent far half panel 88.

While light blocking curtain 10 is shown flattened (e.g., before sewing together adjacent near half panels 78 and adjacent far half panels 88), when in use, light blocking curtain 10 will be partially folded at header pleats 28 and curtain body pleats 22, such that each curtain body segment 24 is non-parallel to each adjacent curtain body segment 24, and such that each header segment 30 is non-parallel to each adjacent header segment 30.

Figure 15:
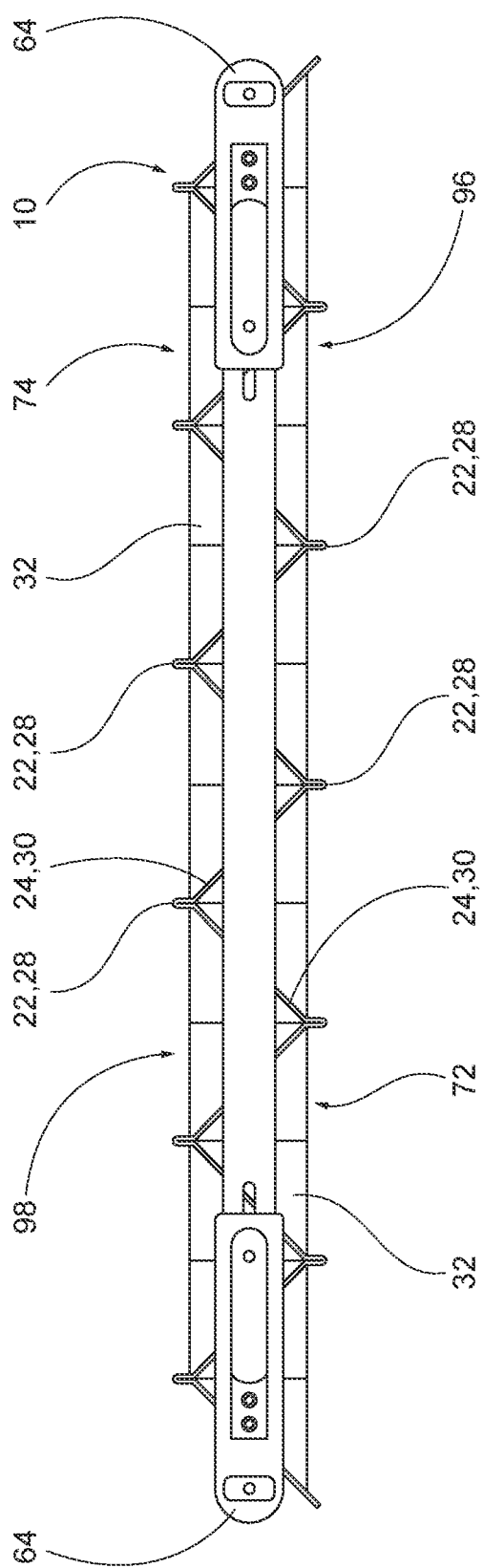
FIG. 15 is top plan view of an example of a light blocking curtain with foldable light blocking panels according to the present disclosure, in the deployed configuration.

For example, FIG. 15 shows an example of light blocking curtain 10 in the deployed configuration, which is shown from above and coupled to a track or rail system 64. As shown in FIG. 15, curtain body 16 is folded at curtain body pleats 22 such that each adjacent curtain body segment 24 is non-parallel to each adjacent curtain body segment 24. Thus, rather than being in a flat plane when in the deployed configuration, light blocking curtain 10 has a three-dimensional shape via pleat angles 40 formed by curtain body pleats 22, as discussed above. In this arrangement, some curtain body pleats 22 open towards the near side 96 of light blocking curtain 10, while some curtain body pleats open towards the far side 98 of light blocking curtain 10. In examples of light blocking curtain 10 where light blocking panels 32 are integrally formed with curtain header 26, light blocking panels 32 positioned on near side 96 of light blocking curtain 10 will be formed by near half header 72, while light blocking panels 32 positioned on far side 98 of light blocking curtain 10 will be formed by far half header 74. In other words, when respective adjacent near half panels 78 are folded with respect to near elongated portion 76 and sewn together, they extend perpendicularly from near elongated portion 76 towards near side 96 of light blocking curtain 10, while when respective adjacent far half panels 88 are folded with respect to far elongated portion 86 and sewing together, they extend perpendicularly from far elongated portion 86 towards far side 98 of light blocking curtain 10 (e.g., in the opposite direction from near half panels 78).

Figure 16:
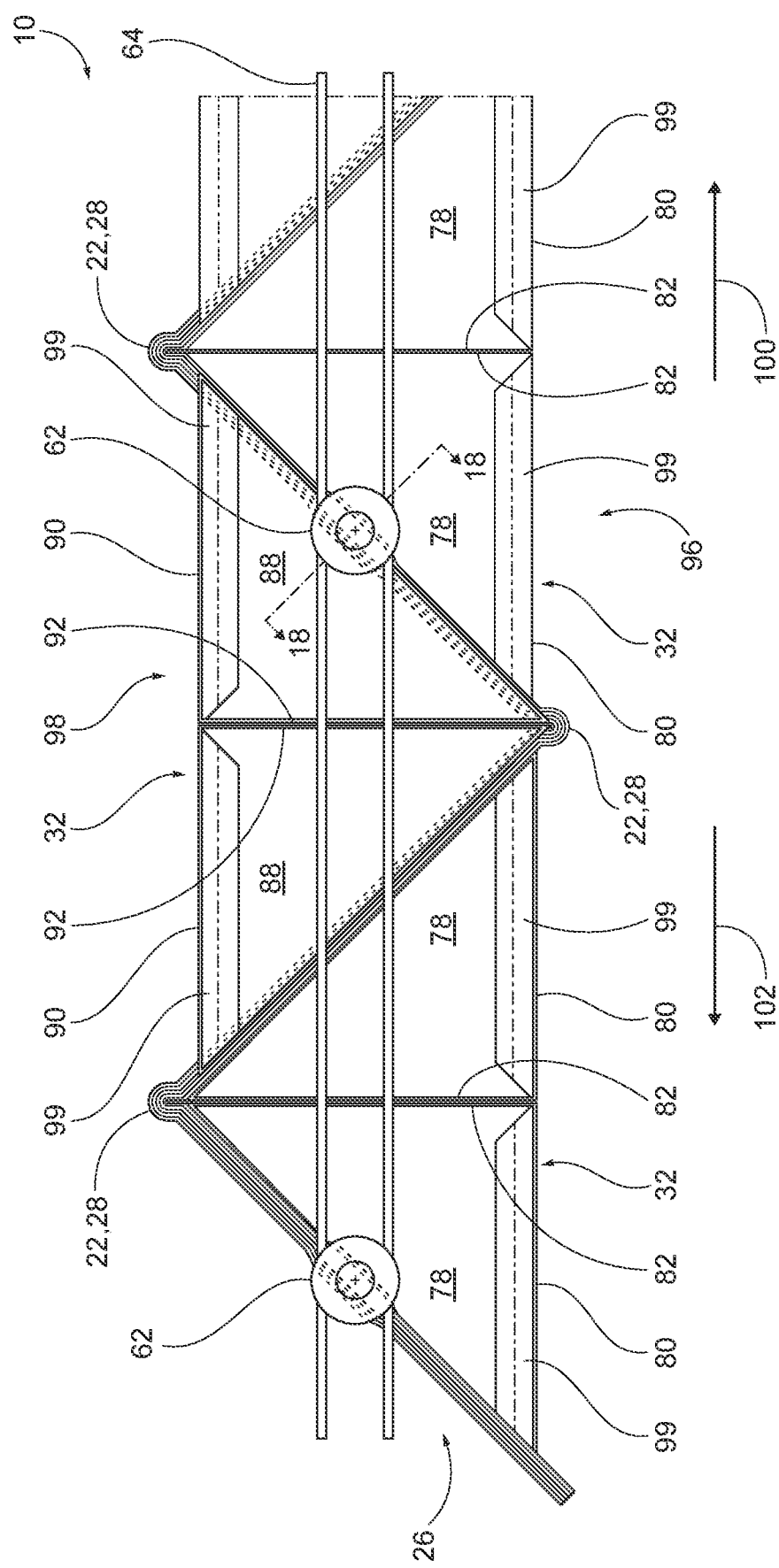
FIG. 16 is a top plan view of an example of a portion of a light blocking curtain of the present disclosure, with a curtain rail schematically represented.

FIG. 16 illustrates this arrangement viewed from the top, with respective adjacent near half panels 78 having been sewn together along their respective inner angled edges 82 to form light blocking panels 32 on near side 96 of light blocking curtain 10, and with respective adjacent far half panels 88 having been sewn together along their respective inner angled edges 92 to form light blocking panels 32 on far side 98 of light blocking curtain 10. Sliders 62 are engaged with curtain header 26 and curtain rails 64 such that sliders 62 may be selectively slid along rails 64 (e.g., in the directions indicated by arrows 100 and 102) to deploy or fold and stow light blocking curtain 10, as desired.

FIG. 17 shows a sectional view illustrating this arrangement, with a respective light blocking panel 32 formed from an adjacent pair of near half panels 78 extending from near side 96 of light blocking curtain 10, and a respective light blocking panel 32 formed from an adjacent pair of far half panels 88 extending from far side 98 of light blocking curtain 10. FIG. 17 illustrates how near half header 72 forms a respective light blocking panel 32 that extends in the opposite direction from a respective light blocking panel 32 formed by far half header 74. Outer angled edges 80 of near half panel 78 and outer angled edges 90 of far half panel 88 may be folded to form hems, as indicated at 99. FIG. 18 is a section view taken at a different location in FIG. 16, showing one example of placement of slider 62 with respect to curtain header 26, near half header 72, and far half header 74.

Figure 19:
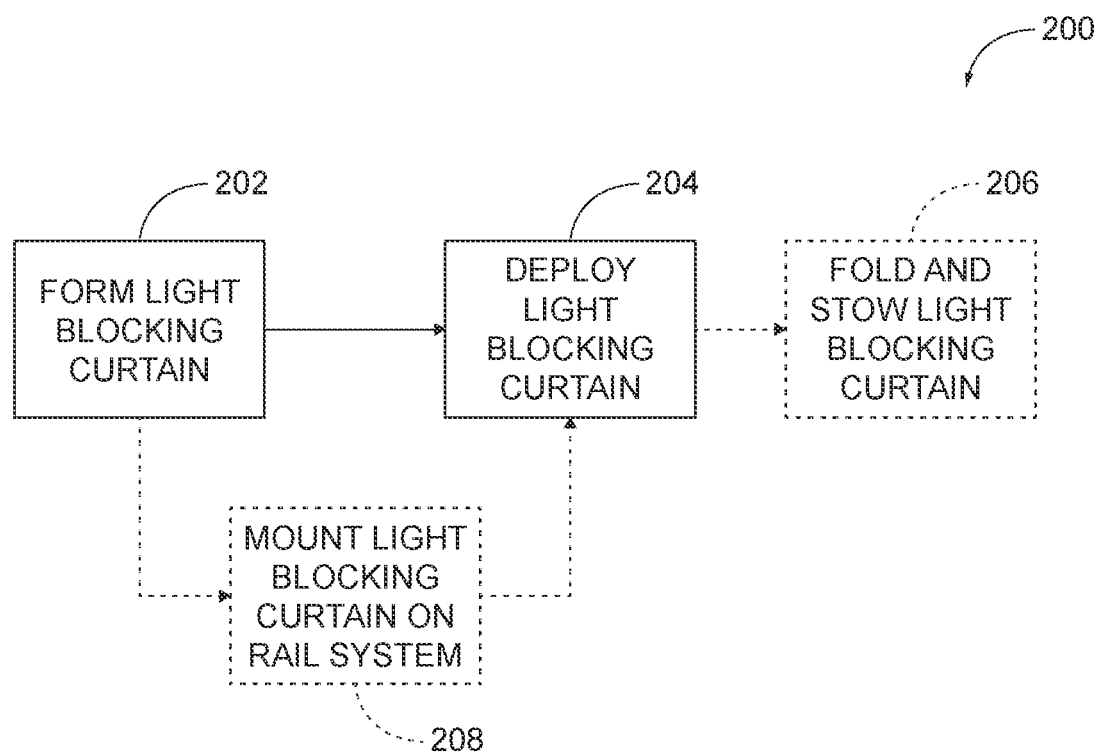
FIG. 19 is a schematic flowchart diagram representing methods according to the present disclosure.

FIG. 19 schematically provides a flowchart that represents illustrative, non-exclusive examples of methods according to the present disclosure. In FIG. 19, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 19 are not limiting and other methods and steps are within the scope of the present disclosure, including methods having greater than or fewer than the number of steps illustrated, as understood from the discussions herein.

Methods 200 of preventing or reducing light leak along a top edge (and/or other edge) of a curtain may include forming a light blocking curtain (e.g., light blocking curtain 10) at 202, and extending the light blocking curtain to the deployed configuration at 204, thereby automatically unfolding a plurality of light blocking panels (e.g., light blocking panels 32) such that they are positioned and configured to prevent or reduce light leak along an edge (e.g., the top edge) of the light blocking curtain. While examples are described herein in the primary context of preventing or reducing light leak along the top edge of a given curtain, presently disclosed light blocking panels and light blocking curtains additionally or alternatively may be used to prevent or reduce light leak along the bottom edge of the curtain by incorporating disclosed light blocking panels along the bottom edge of the curtain in addition to or instead of incorporating them along the top edge of the curtain. In some examples, forming the light blocking curtain at 202 includes retrofitting a conventional curtain to include one or more light blocking panels according to the present disclosure. For example, light blocking panels 32 such as those shown in FIG. 5 may be coupled to a conventional curtain to create a light blocking curtain according to the present disclosure. Or a curtain header formed of a far half header and a near half header as described herein may be added to a conventional curtain body to retrofit a conventional curtain.

The light blocking curtain may be folded and stowed (e.g., transitioned to the stowed configuration) at 206, by folding the light blocking curtain along each of a plurality of curtain body pleats (e.g., curtain body pleats 22) and/or header pleats (e.g., header pleats 28) such that each respective light blocking panel of the plurality of light blocking panels is folded between a respective pair of adjacent header segments (e.g. header segments 30) and/or curtain body segment (e.g., curtain body segments 24). In examples of light blocking curtains that include a near half header and a far half header, the plurality of near light blocking panels of the near half header may be folded between a respective pair of adjacent header segments (e.g. header segments 30) on a near side of the curtain body, while the plurality of far light blocking panels of the far half header may be folded between a respective pair of adjacent curtain body segment (e.g., curtain body segments 24) on the far side of the curtain body.

In some examples, forming the light blocking curtain at 202 includes engaging a plurality of light blocking panels with the curtain header of the light blocking curtain, wherein the curtain header is positioned within the upper end region of the light blocking curtain. For example, forming the light blocking curtain at 202 may include sewing or bonding a plurality of individual respective light blocking panels to the curtain header or to a folded-over portion of the curtain body. In some specific examples, forming the light blocking curtain at 202 may include folding two or more tab portions (e.g., tab portions 44) with respect to a triangular portion of the light blocking panel and at least partially inserting each respective tab portion into a respective pocket of the curtain header of the light blocking curtain to couple the light blocking panel to the curtain header. Said tab portions may be sewn, bonded, or otherwise coupled to the respective pocket and/or other portion of the curtain header in various examples.

In some examples, forming the light blocking curtain at 202 includes coupling each respective light blocking panel to the light blocking curtain such that a central fold line of the light blocking panel is at least substantially aligned with a respective curtain body pleat of the curtain body. In this manner, the triangular portion may be configured to be folded in half along the central fold line such that it can be folded between adjacent respective header segments on the near side of the light blocking curtain, or between adjacent respective curtain body segments on the far side of the light blocking curtain, when the light blocking curtain is folded into the stowed configuration.

In some examples, forming the light blocking curtain at 202 includes folding the bottom of the curtain header up to engage with a folded-over portion of the curtain body (e.g., folded over portion 50) within the upper end region, and coupling the curtain header to the curtain body along the overlapping portion (e.g., overlapping portion 52) where the bottom of the curtain header at least partially overlaps the folded-over portion of the curtain body. This method step can be performed to create a curtain header with pockets (e.g., pockets 56) that are open along the top edge of the light blocking curtain. Additionally or alternatively, forming the light blocking curtain at 202 may include coupling the curtain header to the curtain body via a plurality of vertical seams (e.g., vertical seams 54), wherein each vertical seam is positioned adjacent a respective curtain body pleat, thereby forming a plurality of pockets that open along the top edge of the light blocking curtain, with each respective pocket extending laterally between a respective adjacent pair of vertical seams. In other examples of methods 200, the light blocking curtain may be formed at 202 such that pockets open along the bottom of the curtain header by coupling the curtain header to the curtain body via a plurality of vertical seams.

Some methods include coupling a respective slider to the light blocking curtain within one or more respective pockets and mounting the light blocking curtain to a rail system (e.g., rail system 64) at 208. To this end, forming the light blocking curtain at 202 may include coupling the curtain header to the curtain body such that the coupling between the curtain header and the curtain body includes a plurality of spaced apart gaps, or breaks, (e.g., gaps 68), with each respective gap being configured to receive a portion of a respective slider therethrough. The sliders may be configured to engage with the rail system such that the light blocking curtain is configured to slide open and closed between the deployed configuration and the stowed configuration by selectively translating the sliders with respect to the rail system to selectively expand or contract the light blocking curtain.

Forming the light blocking curtain at 202 may include pleating the curtain body and/or curtain header to form the plurality of curtain body pleats and/or header pleats. Some examples include sewing or bonding a plurality of light blocking panels to the curtain header such that a respective light blocking panel is positioned within each respective header pleat of the curtain header and respective curtain body pleat of the curtain body. In other examples, forming the light blocking curtain at 202 may include integrally forming the plurality of light blocking panels with the curtain header of the light blocking curtain and coupling the curtain header to the curtain body within the upper end region of the curtain body (e.g., along the top edge of the light blocking curtain). The light blocking curtain may be heatset as part of forming the light blocking curtain at 202, to maintain the pleats formed in the curtain body and curtain header, and/or to make folds in the light blocking panels at least substantially permanent.

Forming the light blocking curtain at 202 may include forming the curtain header, such as in examples where the light blocking panels are integrally formed with the curtain header and then coupled to the curtain body. Forming the curtain header may include partially overlaying a near half header (e.g., near half header 72) and a far half header (e.g., far half header 74) onto one another. The far elongated portion of the far half header may be coupled to the curtain body to couple the formed curtain header to the curtain body, and the near elongated portion of the near half header may be coupled to the far elongated portion of the far half header to form the light blocking curtain at 202. When the curtain header is coupled to the curtain body, the near half panels and the far half panels may be positioned such that a respective curtain body pleat is aligned between each respective pair of near half panels and each respective pair of far half panels. Adjacent pairs of near half panels may be coupled together along their inner angled edges to form light blocking panels on the near side of the light blocking curtain, and adjacent pairs of far half panels may be coupled together along their inner angled edges to form light blocking panels on the far side of the light blocking curtain, in forming the light blocking curtain at 202.

Light blocking curtains according to the present disclosure may thus be formed according to methods 200 and used to prevent or reduce light leak in an aircraft cabin or other structure. The present disclosure also includes individual light blocking panels that may be added to conventional curtains to retrofit the conventional curtains to function as a light blocking curtain according to the present disclosure. The present disclosure also includes aircraft that include such disclosed light blocking curtains and light blocking panels. To use, the curtain is unfolded to the deployed configuration, which unfolds the light blocking panels such that they are substantially perpendicular to the curtain body (e.g., for vertical curtain bodies, the light blocking panels may be substantially horizontal when unfolded such that the light blocking curtain is in the deployed configuration). The light blocking panels thus are positioned and sized to close the triangular open spaces on top of the curtain pleats and prevent or reduce the amount of light from passing from one side of the curtain to the other via the triangular openings at the top edge formed by the curtain body pleats. The light blocking curtain may be selectively folded to transition it to the stowed configuration, in which the light blocking panels also fold and become substantially parallel to the curtain body (e.g., vertical) to stow between the folded curtain body segments and/or folded header segments that are folded together via the curtain body pleats and header pleats.

Illustrative, non-exclusive examples of inventive subject matter according to the present disclosure are described in the following enumerated paragraphs:

A1. A light blocking curtain (10) that extends vertically from an upper end region (12) to a lower end region (14), wherein the light blocking curtain (10) is configured to be transitioned between a deployed configuration and a stowed configuration, the light blocking curtain (10) comprising:

a curtain body (16) that extends vertically between the upper end region (12) and the lower end region (14), wherein the curtain body (16) extends horizontally from a first lateral side (18) to a second lateral side (20), wherein the curtain body (16) is configured to be folded to transition the light blocking curtain (10) to the stowed configuration, such that the curtain body (16) extends horizontally to a lesser extent when the light blocking curtain (10) is in the stowed configuration than when the light blocking curtain (10) is in the deployed configuration, and wherein the curtain body (16) comprises a plurality of curtain body pleats (22) and a plurality of curtain body segments (24), wherein each curtain body pleat (22) of the plurality of curtain body pleats (22) extends vertically from the upper end region (12) to or towards the lower end region (14), and wherein each respective curtain body segment (24) extends horizontally between a respective adjacent pair of curtain body pleats (22); and a curtain header (26) positioned within the upper end region (12), wherein the curtain header (26) extends vertically from the upper end region (12) towards the lower end region (14), wherein the curtain header (26) is substantially vertically shorter than the curtain body (16), wherein the curtain header (26) extends horizontally from the first lateral side (18) of the curtain body (16) to the second lateral side (20) of the curtain body (16), wherein the curtain header (26) comprises a plurality of header pleats (28) that extend vertically along the curtain header (26), wherein each respective header pleat (28) is substantially collinear with a respective curtain body pleat (22) such that the curtain header (26) is configured to fold with the curtain body (16) when the light blocking curtain (10) is transitioned to the stowed configuration, wherein the curtain header (26) comprises a plurality of header segments (30), wherein each header segment (30) of the plurality of header segments (30) extends horizontally between a respective adjacent pair of header pleats (28), wherein the curtain header (26) comprises a plurality of light blocking panels (32), wherein each respective light blocking panel (32) of the plurality of light blocking panels (32) is positioned such that each respective light blocking panel (32) spans three respective adjacent curtain body pleats (22) and three respective adjacent header pleats (28), wherein each respective light blocking panel (32) of the plurality of light blocking panels (32) is positioned with respect to two respective adjacent header segments (30) adjacent a top edge (34) of the light blocking curtain (10) such that each respective light blocking panel (32) is configured to prevent or reduce light leak along at least a portion of the top edge (34) of the light blocking curtain (10) between a respective pair of adjacent header segments (30).

A2. The light blocking curtain (10) of paragraph A1, wherein each respective curtain body segment (24) defines a respective curtain segment plane, and wherein at least a portion of each light blocking panel (32) of the plurality of light blocking panels (32) is oriented in a panel plane that is at least substantially orthogonal to the curtain segment plane of the two respective curtain body segments (24) between which the respective light blocking panel (32) is positioned.

A3. The light blocking curtain (10) of any of paragraphs A1-A2, wherein the curtain body (16) is a conventional curtain body, and wherein the curtain header (26) is a conventional curtain header.

A4. The light blocking curtain (10) of any of paragraphs A1-A3, wherein each respective light blocking panel (32) of the plurality of light blocking panels (32) is configured to limit a respective pleat angle (40) of a respective curtain body pleat (22) of the plurality of curtain body pleats (22) to 90 degrees or less when the light blocking curtain (10) is in the deployed configuration.

A5. The light blocking curtain (10) of any of paragraphs A1-A4, wherein each respective light blocking panel (32) of the plurality of light blocking panels (32) is configured to maintain a/the respective pleat angle (40) of each respective curtain body pleat (22) of the plurality of curtain body pleats (22) such that each respective pleat angle (40) is at least substantially the same when the light blocking curtain (10) is in the deployed configuration.

A6. The light blocking curtain (10) of any of paragraphs A1-A5, wherein the light blocking curtain (10) is configured to be transitioned from the deployed configuration to the stowed configuration by folding the light blocking curtain (10) along each of the plurality of curtain body pleats (22) such that each adjacent pair of curtain body segments (24) are closed together or towards each other.

A7. The light blocking curtain (10) of any of paragraphs A1-A6, wherein each respective light blocking panel (32) of the plurality of light blocking panels (32) is configured to be folded and stowed between a respective pair of adjacent curtain body segments (24) of the plurality of curtain body segments (24) when the light blocking curtain (10) is in the stowed configuration.

A8. The light blocking curtain (10) of any of paragraphs A1-A7, wherein the plurality of light blocking panels (32) are configured such that they are automatically unfolded and configured to prevent or reduce light leak along the top edge (34) when the light blocking curtain (10) is transitioned from the stowed configuration to the deployed configuration.

A9. The light blocking curtain (10) of any of paragraphs A1-A8, wherein the plurality of light blocking panels (32) are engaged with and/or coupled to the curtain header (26) of the light blocking curtain (10).

A10. The light blocking curtain (10) of paragraph A9, wherein each light blocking panel (32) of the plurality of light blocking panels (32) comprises an isosceles triangular portion (42) and two tab portions (44), wherein each tab portion (44) is configured to fold with respect to the isosceles triangular portion (42).

A11. The light blocking curtain (10) of paragraph A10, wherein the isosceles triangular portion (42) is configured to be folded in half along a central fold line (46) such that each light blocking panel (32) is configured to be folded and stowed between adjacent respective header segments (30) when the light blocking curtain (10) is in the stowed configuration.

A12. The light blocking curtain (10) of paragraph A11, wherein the central fold line (46) of each respective light blocking panel (32) is at least substantially aligned with a respective curtain body pleat (22) of the plurality of curtain body pleats (22).

A12.1. The light blocking curtain (10) of paragraph A11 or A12, wherein the central fold line (46) of each respective light blocking panel (32) is at least substantially aligned with a respective header pleat (28) of the plurality of header pleats (28).

A13. The light blocking curtain (10) of any of paragraphs A1-A12.1, wherein a bottom (48) of the curtain header (26) is folded up to engage with a folded-over portion (50) of the curtain body (16) within the upper end region (12), and wherein the curtain header (26) is coupled to the curtain body (16) along an overlapping portion (52) where the bottom (48) of the curtain header (26) at least partially overlaps the folded-over portion (50) of the curtain body (16).

A14. The light blocking curtain (10) of paragraph A13, wherein the curtain header (26) is coupled to the curtain body (16) via a plurality of vertical seams (54), wherein each vertical seam (54) of the plurality of vertical seams (54) is positioned adjacent a respective curtain body pleat (22) and header pleat (28).

A15. The light blocking curtain (10) of paragraph A14, wherein the light blocking curtain (10) comprises a plurality of pockets (56) that open along the top edge (34) of the light blocking curtain (10), and wherein each respective pocket (56) of the plurality of pockets (56) extends between a respective adjacent pair of vertical seams (54).

A16. The light blocking curtain (10) of paragraph A15, wherein a first side (58) of each pocket (56) of the plurality of pockets (56) is formed by the curtain header (26), and wherein a second side (60) of each pocket (56) of the plurality of pockets (56) is formed by the curtain body (16).

A17. The light blocking curtain (10) of paragraph A15 or A16, wherein each pocket (56) is configured to receive or house a slider (62) configured to engage with a rail system (64) on which the light blocking curtain (10) is configured to be mounted to slide open and closed between the deployed configuration and the stowed configuration.

A18. The light blocking curtain (10) of any of paragraphs A15-A17, wherein a respective tab portion (44) of a respective light blocking panel (32) is received in each respective pocket (56).

A19. The light blocking curtain (10) of any of paragraphs A15-A18, wherein each respective tab portion (44) of each respective light blocking panel (32) is at least partially inserted into a respective pocket (56) of the plurality of pockets (56).

A20. The light blocking curtain (10) of any of paragraphs A15-A19, wherein each respective tab portion (44) of each respective light blocking panel (32) is coupled to an inside wall (66) of the curtain header (26) within a respective pocket (56), thereby coupling the respective light blocking panel (32) to the light blocking curtain (10).

A20.1. The light blocking curtain (10) of any of paragraphs A15-A19, wherein each respective tab portion (44) of each respective light blocking panel (32) is coupled to a/the first side (58) of a respective pocket (56) and/or to a/the second side (60) of a respective pocket (56), thereby coupling the respective light blocking panel (32) to the light blocking curtain (10).

A21. The light blocking curtain (10) of any of paragraphs A1-A8, wherein the plurality of light blocking panels (32) are integrally formed with the curtain header (26) of the light blocking curtain (10).

A22. The light blocking curtain (10) of paragraph A21, wherein the curtain header (26) is coupled to the curtain body (16) adjacent the top edge (34) of the light blocking curtain (10).

A23. The light blocking curtain (10) of any of paragraphs A21-A22, wherein a coupling between the curtain header (26) and the curtain body (16) comprises a plurality of spaced apart gaps (68), wherein each respective gap (68) of the plurality of spaced apart gaps (68) is configured to receive a portion of a respective slider (62) therethrough, wherein each slider (62) is configured to engage with a rail system (64) on which the light blocking curtain (10) is configured to be mounted to slide open and closed between the deployed configuration and the stowed configuration.

A24. The light blocking curtain (10) of any of paragraphs A21-A23, wherein the curtain header (26) is coupled to the curtain body (16) via a plurality vertical seams (54), wherein each vertical seam (54) of the plurality of vertical seams (54) is positioned adjacent a respective curtain body pleat (22).

A25. The light blocking curtain (10) of paragraph A24, wherein the light blocking curtain (10) comprises a plurality of pockets (56) that open along a bottom (48) of the curtain header (26), and wherein each respective pocket (56) of the plurality of pockets (56) extends between a respective adjacent pair of vertical seams (54).

A26. The light blocking curtain (10) of any of paragraphs A21-A25, wherein the curtain header (26) comprises a near half header (72) and a far half header (74) at least partially overlaid onto one another.

A27. The light blocking curtain (10) of paragraph A25 or A26, wherein a first side (58) of each pocket (56) of a/the plurality of pockets (56) is formed by a/the near half header (72), and wherein a second side (60) of each pocket (56) of the plurality of pockets (56) is formed by a/the far half header (74).

A28. The light blocking curtain (10) of paragraph A26 or A27, wherein the near half header (72) comprises a near elongated portion (76) coupled to an elongated portion (86) of the far half header (74), and a plurality of near half panels (78) extending from the near elongated portion (76).

A29. The light blocking curtain (10) of paragraph A28, wherein each near half panel (78) of the plurality of near half panels (78) comprises an outer angled edge (80) and an inner angled edge (82), wherein the outer angled edge (80) and the inner angled edge (82) are non-parallel and non-perpendicular to a longitudinal axis (84) of the near elongated portion (76).

A30. The light blocking curtain (10) of paragraph A28 or A29, wherein the plurality of near half panels (78) are arranged with respect to one another to form a plurality of pairs of adjacent near half panels (78), wherein in each respective pair of adjacent near half panels (78), the respective inner angled edge (82) of each respective near half panel (78) of the respective pair of adjacent near half panels (78) are positioned next to each other.

A31. The light blocking curtain (10) of any of paragraphs A28-A30, wherein the plurality of near half panels (78) are arranged with respect to one another to form a/the plurality of pairs of adjacent near half panels (78), wherein respective two near half panels (78) of each respective pair of adjacent near half panels (78) are configured to be coupled together along their respective inner angled edges (82).

A32. The light blocking curtain (10) of any of paragraphs A28-A31, wherein the near half panels (78) are configured to fold with respect to the near elongated portion (76) such that the near half panels (78) are configured to be substantially transverse to the near elongated portion (76) when the light blocking curtain (10) is in the deployed configuration.

A33. The light blocking curtain (10) of any of paragraphs A28-A32, wherein the near half header (72) is configured such that the plurality of near half panels (78) are positioned with respect to the curtain body (16) such that a respective curtain body pleat (22) is aligned between each respective adjacent near half panel (78).

A34. The light blocking curtain (10) of any of paragraphs A27-A33, wherein the far half header (74) comprises a/the far elongated portion (86) located between and coupled to the near elongated portion (76) and the curtain body (16), and a plurality of far half panels (88) extending from the far elongated portion (86).

A35. The light blocking curtain (10) of paragraph A34, wherein each far half panel (88) of the plurality of far half panels (88) comprises an outer angled edge (90) and an inner angled edge (92), wherein the outer angled edge (90) and the inner angled edge (92) are non-parallel and non-perpendicular to a/the longitudinal axis (84) of the far elongated portion (86).

A36. The light blocking curtain (10) of paragraph A34 or A35, wherein the plurality of far half panels (88) are arranged with respect to one another to form a plurality of pairs of adjacent far half panels (88), wherein in each respective pair of adjacent far half panels (88), the respective inner angled edge (92) of each far half panel (88) of the respective pair of adjacent far half panels (88) are positioned next to each other.

A37. The light blocking curtain (10) of any of paragraphs A34-A36, wherein the plurality of far half panels (88) are arranged with respect to one another to form a/the plurality of pairs of adjacent far half panels (88), wherein respective two far half panels (88) of each respective pair of adjacent far half panels (88) are configured to be coupled together along their respective inner angled edges (92).

A38. The light blocking curtain (10) of any of paragraphs A34-A37, wherein the plurality of far half panels (88) is configured to fold with respect to the far elongated portion (86) such that the plurality of far half panels (88) is configured to be substantially transverse to the far elongated portion (86) when the light blocking curtain (10) is in the deployed configuration.

A39. The light blocking curtain (10) of any of paragraphs A34-A38, wherein the far half header (74) is configured such that the plurality of far half panels (88) is positioned with respect to the curtain body (16) such that a respective curtain body pleat (22) is aligned between each respective adjacent far half panel (88).

B1. An aircraft, comprising the light blocking curtain (10) of any of paragraphs A1-A39.

B2. The aircraft of paragraph B1, further comprising a railing or track, wherein the light blocking curtain (10) is coupled to the railing or track via a/the plurality of sliders (62) such that the light blocking curtain (10) is configured to be transitioned between the deployed configuration and the stowed configuration by sliding the sliders (62) along the railing or track to fold or unfold the light blocking curtain (10).

C1. A method (200) of preventing or reducing light leak, the method (200) comprising:
Forming (202) the light blocking curtain (10) of any of paragraphs A1-A39; and
Extending (204) the light blocking curtain (10) to the deployed configuration, thereby automatically unfolding the plurality of light blocking panels (32) such that they are positioned and configured to prevent or reduce light leak along the top edge (34) of the light blocking curtain (10).

C2. The method (200) of paragraph C1, wherein the forming (202) the light blocking curtain (10) comprises retrofitting a conventional curtain to include one or more light blocking panels (32).

C3. The method (200) of paragraph C1 or C2, further comprising folding (206) the light blocking curtain (10) along each of the plurality of curtain body pleats (22) such that each respective light blocking panel (32) of the plurality of light blocking panels (32) is folded between a respective pair of adjacent header segments (30) or between a respective pair of adjacent curtain body segments (24), thereby transitioning the light blocking curtain (10) to the stowed configuration.

C4. The method (200) of any of paragraphs C1-C3, wherein the forming (202) the light blocking curtain (10) comprises engaging the plurality of light blocking panels (32) with the curtain header (26) of the light blocking curtain (10), wherein the curtain header (26) is positioned within the upper end region (12) of the light blocking curtain (10).

C5. The method (200) of any of paragraphs C1-C4, wherein each light blocking panel (32) of the plurality of light blocking panels (32) comprises an/the isosceles triangular portion (42) and two tab portions (44), and wherein the forming the light blocking curtain (10) comprises folding each tab portion (44) with respect to the isosceles triangular portion (42).

C6. The method (200) of paragraph C5, wherein the isosceles triangular portion (42) is configured to be folded in half along a/the central fold line (46) such that each light blocking panel (32) is configured to be folded between adjacent respective header segments (30) or between adjacent respective curtain body segments (24) when the light blocking curtain (10) is in the stowed configuration, and wherein the forming the light blocking curtain (10) comprises coupling each respective light blocking panel (32) to the light blocking curtain (10) such that the central fold line (46) is at least substantially aligned with a respective curtain body pleat (22) of the plurality of curtain body pleats (22) of the curtain body (16).

C7. The method (200) of any of paragraphs C1-C6, wherein the forming (202) the light blocking curtain (10) comprises:
folding a/the bottom (48) of the curtain header (26) up to engage with a/the folded-over portion (50) of the curtain body (16) within the upper end region (12); and
coupling the curtain header (26) to the curtain body (16) along an/the overlapping portion (52) where the bottom (48) of the curtain header (26) at least partially overlaps the folded-over portion (50) of the curtain body (16).

C8. The method (200) of any of paragraphs C1-C7, wherein the forming (202) the light blocking curtain (10) comprises coupling the curtain header (26) to the curtain body (16) via a/the plurality of vertical seams (54), wherein each vertical seam (54) of the plurality of vertical seams (54) is positioned adjacent a respective curtain body pleat (22), thereby forming a plurality of pockets (56) that open along the top edge (34) of the light blocking curtain (10), wherein each respective pocket (56) of the plurality of pockets (56) extends between a respective adjacent pair of vertical seams (54).
C9. The method (200) of paragraph C8, further comprising:
coupling (208) a respective slider (62) of a plurality of sliders (62) to the light blocking curtain (10) within one or more respective pockets (56) of the plurality of pockets (56), wherein each slider (62) is configured to engage with a/the rail system (64); and
mounting the light blocking curtain (10) to the rail system (64) such that the light blocking curtain (10) is configured to slide open and closed between the deployed configuration and the stowed configuration.
C10. The method (200) of paragraph C8 or C9, wherein the forming (202) the light blocking curtain (10) comprises at least partially inserting a respective tab portion (44) of a respective light blocking panel (32) into a respective pocket (56) of the plurality of pockets (56), and coupling the respective tab portion (44) to the respective pocket (56).
C11. The method (200) of any of paragraphs C1-C10, wherein the forming (202) the light blocking curtain (10) comprises pleating the curtain body (16) to form the plurality of curtain body pleats (22).
C12. The method (200) of any of paragraphs C1-C11, wherein the forming (202) the light blocking curtain (10) comprises sewing or bonding a plurality of individual respective light blocking panels (32) to the curtain header (26) or folded-over portion (50) of the curtain body (16).
C13. The method (200) of any of paragraphs C1-C12, wherein the forming (202) the light blocking curtain (10) comprises sewing or bonding a plurality of light blocking panels (32) to the curtain header (26) such that a respective light blocking panel (32) is positioned within each respective header pleat (28) of the curtain header (26) and respective curtain body pleat (22) of the curtain body (16).
C14. The method (200) of any of paragraphs C1-C4, wherein the forming (202) the light blocking curtain (10) comprises:
integrally forming the plurality of light blocking panels (32) with a/the curtain header (26) of the light blocking curtain (10); and
coupling the curtain header (26) to the curtain body (16) within the upper end region (12) of the curtain body (16).
C15. The method (200) of any of paragraphs C1-C14, wherein the forming (202) the light blocking curtain (10) comprises coupling the curtain header (26) to the curtain body (16) adjacent the top edge (34) of the light blocking curtain (10).
C16. The method (200) of any of paragraphs C1-C15, wherein the forming the light blocking curtain (10) comprises coupling the curtain header (26) to the curtain body (16) such that a/the coupling between the curtain header (26) and the curtain body (16) comprises a/the plurality of spaced apart gaps (68), wherein each respective gap (68) of the plurality of spaced apart gaps (68) is configured to receive a portion of a respective slider (62) therethrough, wherein each slider (62) is configured to engage with a/the rail system (64) on which the light blocking curtain (10) is configured to be mounted to slide open and closed between the deployed configuration and the stowed configuration.
C17. The method (200) of any of paragraphs C1-C16, wherein the forming (202) the light blocking curtain (10) comprises coupling the curtain header (26) to the curtain body (16) via a/the plurality of vertical seams (54), wherein each vertical seam (54) of the plurality of vertical seams (54) is positioned adjacent a respective curtain body pleat (22), thereby forming a/the plurality of pockets (56) that open along a/the bottom (48) of the curtain header (26), wherein each respective pocket (56) of the plurality of pockets (56) extends between a respective adjacent pair of vertical seams (54).
C18. The method (200) of any of paragraphs C1-C17, wherein the forming (202) the light blocking curtain (10) comprises forming the curtain header (26).
C19. The method (200) of paragraph C18, wherein the forming the curtain header (26) comprises at least partially overlaying a/the near half header (72) and a/the far half header (74) onto one another.
C20. The method (200) of paragraph C19, wherein the forming the curtain header (26) comprises coupling a/the near elongated portion (76) of the near half header (72) to the far elongated portion (86) of the far half header (74) and curtain body (16).
C21. The method (200) of paragraph C19 or C20, wherein the near half header (72) comprises a/the plurality of near half panels (78) extending from a/the near elongated portion (76), wherein each near half panel (78) of the plurality of near half panels (78) comprises an/the outer angled edge (80) and an/the inner angled edge (82), wherein the outer angled edge (80) and the inner angled edge (82) are non-parallel and non-perpendicular to a/the longitudinal axis (84) of the near elongated portion (76).
C22. The method (200) of paragraph C21, wherein the forming the curtain header (26) comprises arranging the plurality of near half panels (78) with respect to one another to form a/the plurality of pairs of adjacent near half panels (78), wherein in each respective pair of adjacent near half panels (78), a/the respective inner angled edges (82) of the adjacent near half panels (78) of the respective pair are positioned next to each other.
C23. The method (200) of paragraph C21 or C22, wherein the forming the curtain header (26) comprises:
arranging the plurality of near half panels (78) with respect to one another to form a/the plurality of pairs of adjacent near half panels (78); and
coupling the respective two near half panels (78) of each respective pair of adjacent near half panels (78) along their respective inner angled edges (82).
C24. The method (200) of any of paragraphs C19-C23, wherein the forming the curtain header (26) comprises positioning the near half panels (78) with respect to the curtain body (16) such that a/the respective curtain body pleat (22) is aligned between each respective adjacent near half panel (78).
C25. The method (200) of any of paragraphs C19-C24, wherein the forming the curtain header (26) comprises coupling a/the far elongated portion (86) of the far half header (74) to the near elongated portion (76) of the near half header (72) and the curtain body (16).
C26. The method (200) of any of paragraphs C19-C25, wherein the far half header (74) comprises a/the plurality of far half panels (88) extending from a/the far elongated portion (86), wherein each far half panel (88) of the plurality of far half panels (88) comprises an/the outer angled edge (90) and an/the inner angled edge (92), wherein the outer angled edge (90) and the inner angled edge (92) are non-parallel and non-perpendicular to a/the longitudinal axis (84) of the far elongated portion (86).

C27. The method (200) of paragraph C26, wherein the forming the curtain header (26) comprises arranging the plurality of far half panels (88) with respect to one another to form a/the plurality of pairs of adjacent far half panels (88), wherein in each respective pair of adjacent far half panels (88), a/the respective inner angled edges (92) of the adjacent far half panels (88) of the respective pair are positioned next to each other.

C28. The method (200) of paragraph C26 or C27, wherein the forming the curtain header (26) comprises:
arranging the plurality of far half panels (88) with respect to one another to form a/the plurality of pairs of adjacent far half panels (88); and
coupling the respective two far half panels (88) of each respective pair of adjacent far half panels (88) along their respective inner angled edges (92).

C29. The method (200) of any of paragraphs C19-C28, wherein the forming the curtain header (26) comprises positioning the far half panels (88) with respect to the curtain body (16) such that a/the respective curtain body pleat (22) is aligned between each respective adjacent far half panel (88).

C30. The method (200) of any of paragraphs C1-C29, comprising forming the curtain header (26), wherein the forming the curtain header (26) comprises coupling a/the near half header (72) and a/the far half header (74) to the curtain body (16) such that the near half header (72) and the far half header (74) form the curtain header (26).

C31. The method (200) of paragraph C30, further comprising forming a/the plurality of curtain body pleats (22) in the curtain header (26) and the curtain body (16).

C32. The method (200) of paragraph C31, further comprising:
coupling a plurality of respective adjacent pairs of near half panels (78) together, thereby forming a plurality of near light blocking panels (32); and
coupling a plurality of respective adjacent pairs of far half panels (88) together, thereby forming a plurality of far light blocking panels (32).

C33. The method (200) of paragraph C32, further comprising:
folding the plurality of near light blocking panels (32) in half such that each respective near light blocking panel (32) is positioned within a respective header pleat (28) on a near side of the light blocking curtain (10);
folding the plurality of far light blocking panels (32) in half such that each respective far light blocking panel (32) is positioned within a respective vertically curtain body pleat (22) on a far side of the light blocking curtain (10); and
heat setting the curtain body (16), the near half header (72), and the far half header (74).

D1. A light blocking panel (32) for prevent or reducing light leak around a curtain, wherein the light blocking panel (32) is configured to be positioned within an upper end region (12) of a curtain body (16) of the curtain, wherein the light blocking panel (32) is configured to be positioned to span between three respective adjacent curtain body pleats (22) or three respective adjacent header pleats (28) of the curtain, and wherein the light blocking panel (32) is configured to prevent or reduce light leak along at least a portion of the top edge (34) of the curtain.

D2. The light blocking panel (32) of paragraph D1, wherein the light blocking panel (32) is configured to limit a pleat angle (40) of a curtain body pleat (22) of the curtain to 90 degrees or less when the curtain is in a deployed configuration.

D3. The light blocking panel (32) of any of paragraphs D1-D2, wherein the light blocking panel (32) is configured such that each respective light blocking panel (32) of a plurality of light blocking panels (32) maintains a respective pleat angle (40) of a respective curtain body pleat (22) and/or header pleat (28) of the curtain, such that the respective pleat angle (40) is at least substantially the same for each respective curtain body pleat (22) of a plurality of curtain body pleats (22) and/or each respective header pleat (28) of a plurality of header pleats (28) of the curtain when the curtain is in a/the deployed configuration.

D3.1. The light blocking panel (32) of any of paragraphs D1-D3, wherein a/the plurality of light blocking panels (32) are together configured to prevent or reduce light leak along the top edge (34) of the curtain.

D4. The light blocking panel (32) of any of paragraphs D1-D3.1, wherein the light blocking panel (32) is configured to be folded and stowed between a pair of adjacent curtain body segments (24) or a pair of adjacent header segments (30) of the curtain when the curtain is in a stowed configuration.

D5. The light blocking panel (32) of any of paragraphs D1-D4, wherein the light blocking panel (32) is configured such that it is automatically unfolded and configured to prevent light leak along a span of the light blocking panel (32) along the top edge (34) of the curtain when the curtain is transitioned from a/the stowed configuration to a/the deployed configuration.

D6. The light blocking panel (32) of any of paragraphs D1-D5, wherein the light blocking panel (32) is configured to engage with a curtain header (26) of the curtain, wherein the curtain header (26) is positioned within the upper end region (12) of the light blocking curtain (10).

D7. The light blocking panel (32) of any of paragraphs D1-D6, wherein the light blocking panel (32) comprises an isosceles triangular portion (42) and two tab portions (44), wherein each tab portion (44) is configured to fold with respect to the isosceles triangular portion (42).

D8. The light blocking panel (32) of paragraph D7, wherein the isosceles triangular portion (42) is configured to be folded in half along a central fold line (46) such that the light blocking panel (32) is configured to be folded between adjacent respective curtain body pleats (22) or adjacent respective header pleats (28) of the curtain when the curtain is in a/the stowed configuration.

D9. The light blocking panel (32) of paragraph D8, wherein the central fold line (46) of the light blocking panel (32) is at least substantially aligned with a respective curtain body pleat (22) of a/the plurality of curtain body pleats (22) when the light blocking panel (32) is coupled with respect to the curtain.

D10. The light blocking panel (32) of any of paragraphs D7-D9, wherein each respective tab portion (44) is configured to be at least partially inserted into and coupled to a respective pocket (56) formed in the curtain.

D11. The light blocking panel (32) of any of paragraphs D1-D5, wherein the light blocking panel (32) comprises a/the plurality of light blocking panels (32) integrally formed with a/the curtain header (26) of the curtain.

D12. The light blocking panel (32) of paragraphs D11, wherein the curtain header (26) comprises a near half header (72) and a far half header (74) at least partially overlaid onto one another.

D13. The light blocking panel (32) of paragraph D12, wherein the near half header (72) comprises a near elongated portion (76) configured to be coupled to the curtain, and a plurality of near half panels (78) extending from the near elongated portion (76).

D14. The light blocking panel (32) of paragraph D13, wherein each near half panel (78) of the plurality of near half panels (78) comprises an outer angled edge (80) and an inner angled edge (82), wherein the outer angled edge (80) and the inner angled edge (82) are non-parallel and non-perpendicular to a longitudinal axis (84) of the near elongated portion (76).

D15. The light blocking panel (32) of paragraph D13 or D14, wherein the plurality of near half panels (78) are arranged with respect to one another to form a plurality of pairs of adjacent near half panels (78), wherein in each respective pair of adjacent near half panels (78), the respective inner angled edge (82) of each adjacent near half panel (78) of the respective pair are positioned next to each other.

D16. The light blocking panel (32) of any of paragraphs D13-D15, wherein the plurality of near half panels (78) are arranged with respect to one another to form a/the plurality of pairs of adjacent near half panels (78), wherein respective two near half panels (78) of each respective pair of adjacent near half panels (78) are configured to be coupled together along their respective inner angled edges (82) to form a first plurality of light blocking panels (32) on a/the near side of the curtain.

D17. The light blocking panel (32) of any of paragraphs D13-D16, wherein the plurality of near half panels (78) is configured to fold with respect to the near elongated portion (76) such that the plurality of near half panels (78) is configured to be substantially transverse to the near elongated portion (76) when the curtain is in a/the deployed configuration.

D18. The light blocking panel (32) of any of paragraphs D13-D17, wherein the near half header (72) is coupled with respect to the curtain such that a respective curtain body pleat (22) of the curtain is aligned between each respective adjacent near half panel (78).

D19. The light blocking curtain (10) of any of paragraphs D12-D18, wherein the far half header (74) comprises a far elongated portion (86) configured to be coupled to the curtain, and a plurality of far half panels (88) extending from the far elongated portion (86).

D20. The light blocking panel (32) of paragraph D19, wherein each far half panel (88) of the plurality of far half panels (88) comprises an outer angled edge (90) and an inner angled edge (92), wherein the outer angled edge (90) and the inner angled edge (92) are non-parallel and non-perpendicular to a/the longitudinal axis (84) of the far elongated portion (86).

D21. The light blocking panel (32) of paragraph D19 or D20, wherein the plurality of far half panels (88) are arranged with respect to one another to form a plurality of pairs of adjacent far half panels (88), wherein in each respective pair of adjacent far half panels (88), the respective inner angled edge (92) of each adjacent far half panel (88) of the respective pair are positioned next to each other.

D22. The light blocking panel (32) of any of paragraphs D19-D21, wherein the plurality of far half panels (88) are arranged with respect to one another to form a/the plurality of pairs of adjacent far half panels (88), wherein a respective two far half panels (88) of each respective pair of adjacent far half panels (88) are configured to be coupled together along their respective inner angled edges (92) to form a second plurality of light blocking panels (32) on a/the far side of the curtain.

D23. The light blocking panel (32) of any of paragraphs D19-D22, wherein the plurality of far half panels (88) is configured to fold with respect to the far elongated portion (86) such that the plurality of far half panels (88) is configured to be substantially transverse to the far elongated portion (86) when the curtain is in a/the deployed configuration.

D24. The light blocking panel (32) of any of paragraphs D19-D23, wherein the far half header (74) is coupled with respect to the curtain such that a respective curtain body pleat (22) of the curtain is aligned between each respective adjacent far half panel (88).

E1. A light blocking curtain (10) comprising one or more of the light blocking panels (32) of any of paragraphs D1-D24.

F1. A method (200) of preventing or reducing light leak in an aircraft passenger cabin, the method (200) comprising retrofitting a conventional partition curtain with one or more of the light blocking panels (32) according to any of paragraphs D1-D24.

G1. The use of the light blocking curtain (10) of any of paragraphs A1-A39 to prevent or reduce light leak within a passenger aircraft or other vehicle.

G2. The use of one or more of the light blocking panels (32) of any of paragraphs D1-D24 to retrofit a curtain of a passenger aircraft or other vehicle to prevent or reduce light leak within the passenger aircraft or other vehicle.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A light blocking panel for preventing or reducing light leak along a top edge of a curtain, the light blocking panel comprising:
an isosceles triangular portion configured to be folded in half along a central fold line such that the light blocking panel is configured to be folded between adjacent respective curtain body segments or header segments of the curtain when the curtain is in a stowed configuration; and
two tab portions, wherein each tab portion is configured to fold with respect to the isosceles triangular portion, wherein each respective tab portion is configured to be at least partially inserted into and coupled to a respective pocket formed in the curtain, wherein the light blocking panel is configured such that it is automatically unfolded when the curtain is transitioned from the stowed configuration to a deployed configuration, and wherein the light blocking panel is configured to prevent or reduce light leak along a span of the light blocking panel along the top edge of the curtain.

2. The light blocking panel according to claim 1, wherein the light blocking panel is configured to be positioned within an upper end region of a curtain body of the curtain, wherein the light blocking panel is configured to be positioned to span between three respective adjacent curtain body pleats of the curtain, and wherein the light blocking panel is configured to limit a pleat angle of a curtain body pleat of the curtain to 90 degrees or less when the curtain is in the deployed configuration.

3. The light blocking panel according to claim 1, wherein the light blocking panel is configured such that each respective light blocking panel of a plurality of light blocking panels maintains a respective pleat angle of a respective curtain body pleat of the curtain, such that the respective pleat angle is at least substantially the same for each respective curtain body pleat of a plurality of curtain body pleats of the curtain when the curtain is in the deployed configuration, and wherein the central fold line of each light blocking panel of the plurality of light blocking panels is at least substantially aligned with a respective curtain body pleat of the plurality of curtain body pleats when the light blocking panel is coupled with respect to the curtain.

4. A light blocking curtain comprising the plurality of light blocking panels according to claim 3, wherein the plurality of light blocking panels together are configured to prevent or reduce light leak along the top edge of the curtain.

5. A curtain header for a light blocking curtain, the curtain header comprising:
a near half header, wherein the near half header comprises a near elongated portion configured to be coupled to a far elongated portion of a far half header and a curtain body of the light blocking curtain, and a plurality of near half panels extending from the near elongated portion, wherein each near half panel of the plurality of near half panels comprises an outer angled edge and an inner angled edge, wherein the outer angled edge and the inner angled edge are non-parallel and non-perpendicular to a longitudinal axis of the near elongated portion, wherein the plurality of near half panels is configured to fold with respect to the near elongated portion such that the plurality of near half panels is configured to be substantially transverse to the near elongated portion when the curtain is in a deployed configuration; and a far half header, wherein the far half header comprises a far elongated portion configured to be coupled to the curtain body, and a plurality of far half panels extending from the far elongated portion, wherein each far half panel of the plurality of far half panels comprises an outer angled edge and an inner angled edge, wherein the outer angled edge and the inner angled edge are non-parallel and non-perpendicular to a/the longitudinal axis of the far elongated portion, wherein the plurality far half panels is configured to fold with respect to the far elongated portion such that the plurality far half panels is configured to be substantially transverse to the far elongated portion when the curtain is in the deployed configuration, and wherein the near half header and the far half header are at least partially overlaid onto one another.

6. The curtain header according to claim 5, wherein the plurality of near half panels are arranged with respect to one another to form a plurality of pairs of adjacent near half panels, wherein in each respective pair of adjacent near half panels, the respective inner angled edge of each adjacent near half panel of the respective pair are positioned next to each other, wherein the plurality of far half panels are arranged with respect to one another to form a plurality of pairs of adjacent far half panels, and wherein in each respective pair of adjacent far half panels, the respective inner angled edge of each adjacent far half panel of the respective pair are positioned next to each other.

7. The curtain header according to claim 6, wherein the respective two near half panels of each respective pair of adjacent near half panels are configured to be coupled together along their respective inner angled edges to form a first plurality of light blocking panels on a near side of the curtain, wherein the respective two far half panels of each respective pair of adjacent far half panels are configured to be coupled together along their respective inner angled edges to form a second plurality of light blocking panels on a far side of the curtain, such that the first plurality of light blocking panels and the second plurality of light blocking panels are integrally formed with the curtain header, and wherein the first plurality of light blocking panels and the second plurality of light blocking panels are configured for preventing or reducing light leak along a top edge of the curtain.

8. The curtain header according to claim 5, wherein the curtain header is configured to be positioned within an upper end region of the curtain body, wherein each respective light blocking panel of the first plurality of light blocking panels is configured to be positioned to span between three respective adjacent header pleats of the curtain header, wherein each respective light blocking panel of the second plurality of light blocking panels is configured to be positioned to span between three respective adjacent curtain body pleats of the curtain body, wherein the first plurality of light blocking panels is configured to be folded and stowed between a pair of adjacent header segments of the curtain header on a near side of the light blocking curtain when the light blocking curtain is in a stowed configuration, wherein the second plurality of light blocking panels is configured to be folded and stowed between a pair of adjacent curtain body segments of the curtain body on a far side of the light blocking curtain when the light blocking curtain is in the stowed configuration, and wherein the first plurality of light blocking panels and the second plurality of light blocking panels are configured such that they are automatically unfolded and configured to prevent light leak along a top edge of the light blocking curtain when the light blocking curtain is transitioned from the stowed configuration to the deployed configuration.

9. The light blocking curtain, comprising the curtain header according to claim 5.

10. A light blocking curtain that extends vertically from an upper end region to a lower end region, wherein the light blocking curtain is configured to be transitioned between a deployed configuration and a stowed configuration, the light blocking curtain comprising:

a curtain body that extends vertically between the upper end region and the lower end region, wherein the curtain body extends horizontally from a first lateral side to a second lateral side, wherein the curtain body is configured to be folded to transition the light blocking curtain to the stowed configuration, such that the curtain body extends horizontally to a lesser extent when the light blocking curtain is in the stowed configuration than when the light blocking curtain is in the deployed configuration, and wherein the curtain body comprises a plurality of curtain body pleats and a plurality of curtain body segments, wherein each curtain body pleat of the plurality of curtain body pleats extends vertically from the upper end region to the lower end region, and wherein each respective curtain body segment extends horizontally between a respective adjacent pair of curtain body pleats; and a curtain header positioned within the upper end region, wherein the curtain header extends vertically from the upper end region towards the lower end region, wherein the curtain header is substantially vertically shorter than the curtain body, wherein the curtain header extends horizontally from the first lateral side of the curtain body to the second lateral side of the curtain body, wherein the curtain header comprises a plurality of header pleats that extend vertically along the curtain header, wherein each respective header pleat is substantially collinear with a respective curtain body pleat such that the curtain header is configured to fold with the curtain body when the light blocking curtain is transitioned to the stowed configuration, wherein the curtain header comprises a plurality of header segments, wherein each header segment of the plurality of header segments extends horizontally between a respective adjacent pair of header pleats, wherein the curtain header comprises a plurality of light blocking panels, wherein each respective light blocking panel of the plurality of light blocking panels is positioned such that each respective light blocking panel spans three respective adjacent curtain body pleats or three respective adjacent header pleats, wherein each respective light blocking panel of the plurality of light blocking panels is positioned with respect to two respective adjacent header segments or two respective adjacent curtain body segments adjacent a top edge of the light blocking curtain such that each respective light blocking panel is configured to prevent or reduce light leak along the top edge of the light blocking curtain between a respective pair of adjacent header segments on the near side of the light blocking curtain or between a respective pair of adjacent curtain body segments on the far side of the light blocking curtain.

11. The light blocking curtain according to claim 10, wherein each respective curtain body segment or each respective header segment defines a respective curtain segment plane, and wherein at least a portion of each light blocking panel of the plurality of light blocking panels is oriented in a panel plane that is at least substantially orthogonal to each respective curtain segment plane of two respective curtain body segments or two respective header segment between which the respective light blocking panel is positioned.

12. The light blocking curtain according to claim 10, wherein each respective light blocking panel of the plurality of light blocking panels are configured to limit a respective pleat angle of a respective curtain body pleat of the plurality of curtain body pleats to 90 degrees or less when the light blocking curtain is in the deployed configuration.

13. The light blocking curtain according to claim 10, wherein the light blocking curtain is configured to be transitioned from the deployed configuration to the stowed configuration by folding the light blocking curtain along each of the plurality of curtain body pleats, wherein each respective light blocking panel of the plurality of light blocking panels is configured to be folded and stowed between a respective pair of adjacent curtain body segments or between a respective pair of adjacent curtain header segment when the light blocking curtain is in the stowed configuration, and wherein the plurality of light blocking panels are configured such that they are automatically unfolded and configured to prevent light leak along the top edge when the light blocking curtain is transitioned between from the stowed configuration to the deployed configuration.

14. The light blocking curtain according to claim 10, wherein the curtain header is coupled to the curtain body via a plurality of vertical seams, wherein the light blocking curtain comprises a plurality of pockets that open along the top edge of the light blocking curtain, and wherein each respective pocket of the plurality of pockets extends between a respective adjacent pair of vertical seams.

15. The light blocking curtain according to claim 14, wherein each pocket is configured to receive a slider configured to engage with a rail system on which the light blocking curtain is configured to be mounted to slide open and closed between the deployed configuration and the stowed configuration, and wherein respective tab portions of each respective light blocking panel is at least partially inserted into a respective pocket of the plurality of pockets.

16. The light blocking curtain according to claim 10, wherein the curtain header is coupled to the curtain body via a plurality of vertical seams, wherein the light blocking curtain comprises a plurality of pockets that open along a bottom of the curtain header, and wherein each respective pocket of the plurality of pockets extends between a respective adjacent pair of vertical seams.

17. The light blocking curtain according to claim 16, wherein the curtain header comprises a near half header and a far half header at least partially overlaid onto one another, wherein the near half header comprises a near elongated portion configured to be coupled to the far half header, and a plurality of near half panels extending from the near elongated portion, and wherein the far half header comprises a far elongated portion configured to be coupled to the curtain body, and a plurality of far half panels extending from the far elongated portion.

18. The light blocking curtain according to claim 17, wherein each respective near half panel of the plurality of near half panels comprises a respective near outer angled edge and a respective near inner angled edge, wherein the respective near outer angled edge and the respective near inner angled edge are non-parallel and non-perpendicular to a longitudinal axis of the near elongated portion, wherein each respective far half panel of the plurality of far half panels comprises a respective far outer angled edge and a respective far inner angled edge, wherein the respective far outer angled edge and the respective far inner angled edge are non-parallel and non-perpendicular to a longitudinal axis of the far elongated portion, wherein the plurality of near half panels are arranged with respect to one another to form a plurality of pairs of adjacent near half panels, wherein in each respective pair of adjacent near half panels, the respective near inner angled edge of each adjacent near half panel of the respective pair are positioned next to each other and configured to be coupled together, wherein the plurality of far half panels are arranged with respect to one another to form a plurality of pairs of adjacent far half panels, wherein in each respective pair of adjacent far half panels, the respective far inner angled edge of each adjacent far half panel of the respective pair are positioned next to each other and configured to be coupled together.

19. The light blocking curtain according to claim 18, wherein the plurality of near half panels is configured to fold with respect to the near elongated portion such that the plurality of near half panels is configured to be substantially transverse to the near elongated portion when the light blocking curtain is in the deployed configuration, and wherein the plurality of far half panels is configured to fold with respect to the far elongated portion such that the plurality of far half panels is configured to be substantially transverse to the far elongated portion when the light blocking curtain is in the deployed configuration.

20. An aircraft, comprising:
the light blocking curtain according to claim 10; and
a track, wherein the light blocking curtain is coupled to the track via a plurality of sliders such that the light blocking curtain is configured to be transitioned between the deployed configuration and the stowed configuration by sliding the sliders along the track to fold or unfold the light blocking curtain.

* * * * *